(12) United States Patent
Gould et al.

(10) Patent No.: US 7,275,761 B2
(45) Date of Patent: *Oct. 2, 2007

(54) AIR BAG MODULE WITH LOCKING MEMBER FOR LOCKING THE POSITION OF A VENT MEMBER

(75) Inventors: Douglas M. Gould, Lake Orion, MI (US); Chris Purcell, Southgate, MI (US); Michael J. Loyd, Rochester Hills, MI (US); Kurt F. Fischer, Leonard, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 282 days.

This patent is subject to a terminal disclaimer.

(21) Appl. No.: 11/063,948

(22) Filed: Feb. 23, 2005

(65) Prior Publication Data

US 2005/0146122 A1 Jul. 7, 2005

Related U.S. Application Data

(63) Continuation-in-part of application No. 10/917,581, filed on Aug. 13, 2004, which is a continuation-in-part of application No. 10/244,933, filed on Sep. 16, 2002, now Pat. No. 7,083,191.

(51) Int. Cl.
*B60R 21/276* (2006.01)

(52) U.S. Cl. .................................. 280/742; 280/743.2

(58) Field of Classification Search .............. 280/736, 280/739, 742, 743.2
See application file for complete search history.

(56) References Cited

U.S. PATENT DOCUMENTS 3,888,508 A    6/1975   Kizu et al.
5,246,250 A    9/1993   Wolanin et al.
5,280,953 A    1/1994   Wolanin et al.
5,405,166 A    4/1995   Rogerson
5,489,119 A    2/1996   Prescaro et al.
5,501,488 A    3/1996   Saderholm et al.
5,762,367 A    6/1998   Wolanin
5,799,974 A    9/1998   Honda
5,853,192 A   12/1998   Sikorski et al.
6,017,056 A    1/2000   Lee
6,095,557 A    8/2000   Takimoto et al.
6,131,942 A   10/2000   Fujii et al.

(Continued)

FOREIGN PATENT DOCUMENTS

DE    19703945    8/1998

(Continued)

*Primary Examiner*—Paul N. Dickson
*Assistant Examiner*—Laura B. Freedman
(74) *Attorney, Agent, or Firm*—Tarolli, Sundheim, Covell & Tummino, LLP

(57) ABSTRACT

A vehicle occupant protection apparatus (800) includes an inflatable occupant protection device (802) and a vent opening (876) through which inflation fluid may flow. The vehicle occupant protection apparatus (800) also includes a retainer (910) to which the protection device (802) is secured. A vent member (890) is movable relative to the vent opening (876) for controlling a flow of inflation fluid through the vent opening (876). A tether (990) is movable in response to inflation of the protection device (802) beyond a predetermined distance for moving the vent member (824). A tether guide member (940) is located on the retainer (910) for guiding the tether (990).

20 Claims, 13 Drawing Sheets

U.S. PATENT DOCUMENTS

| | | |
|---|---|---|
| 6,161,866 A | 12/2000 | Ryan et al. |
| 6,206,408 B1 | 3/2001 | Schneider |
| 6,371,517 B1 | 4/2002 | Webber et al. |
| 6,648,371 B2 | 11/2003 | Vendely et al. |
| 2003/0155756 A1 | 8/2003 | Hawthorn et al. |
| 2003/0189326 A1 | 10/2003 | Short et al. |
| 2004/0051285 A1 | 3/2004 | Fischer |

FOREIGN PATENT DOCUMENTS

| | | |
|---|---|---|
| DE | 19912369 | 10/2000 |
| EP | 0332325 | 9/1989 |
| GB | 2338214 | 12/1999 |

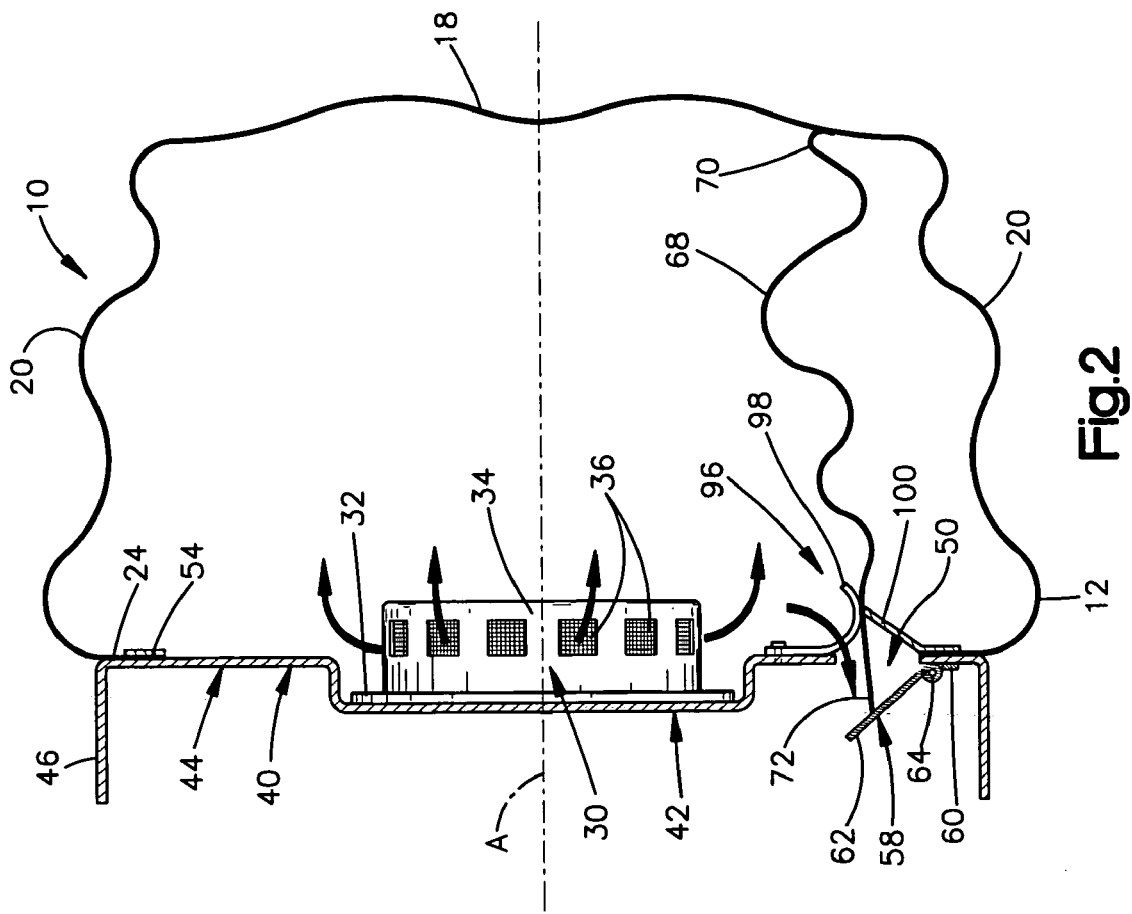
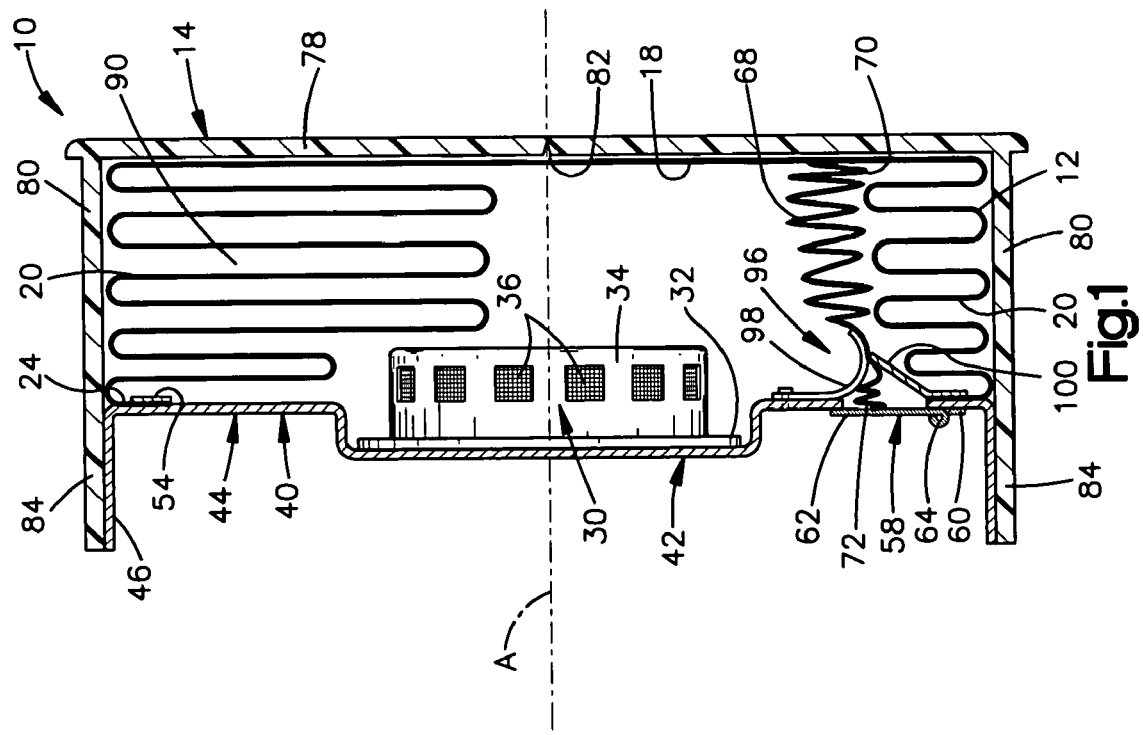

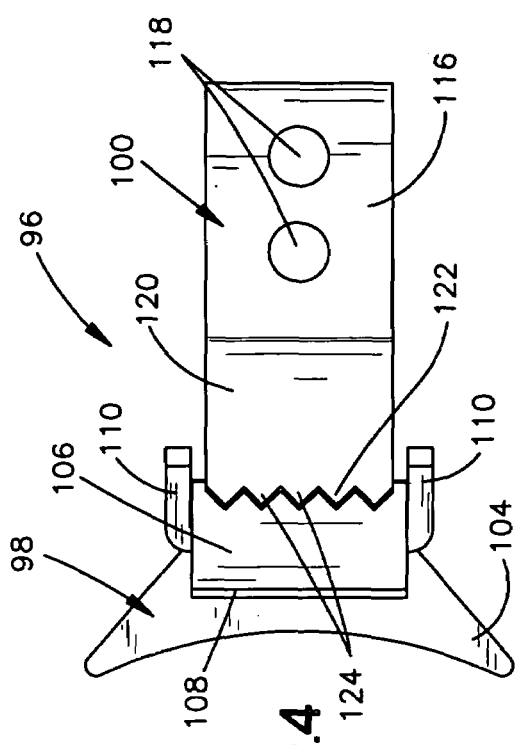
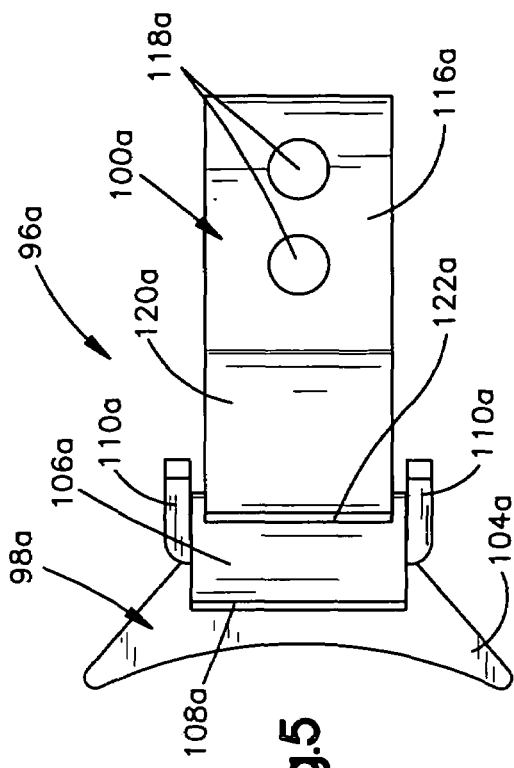
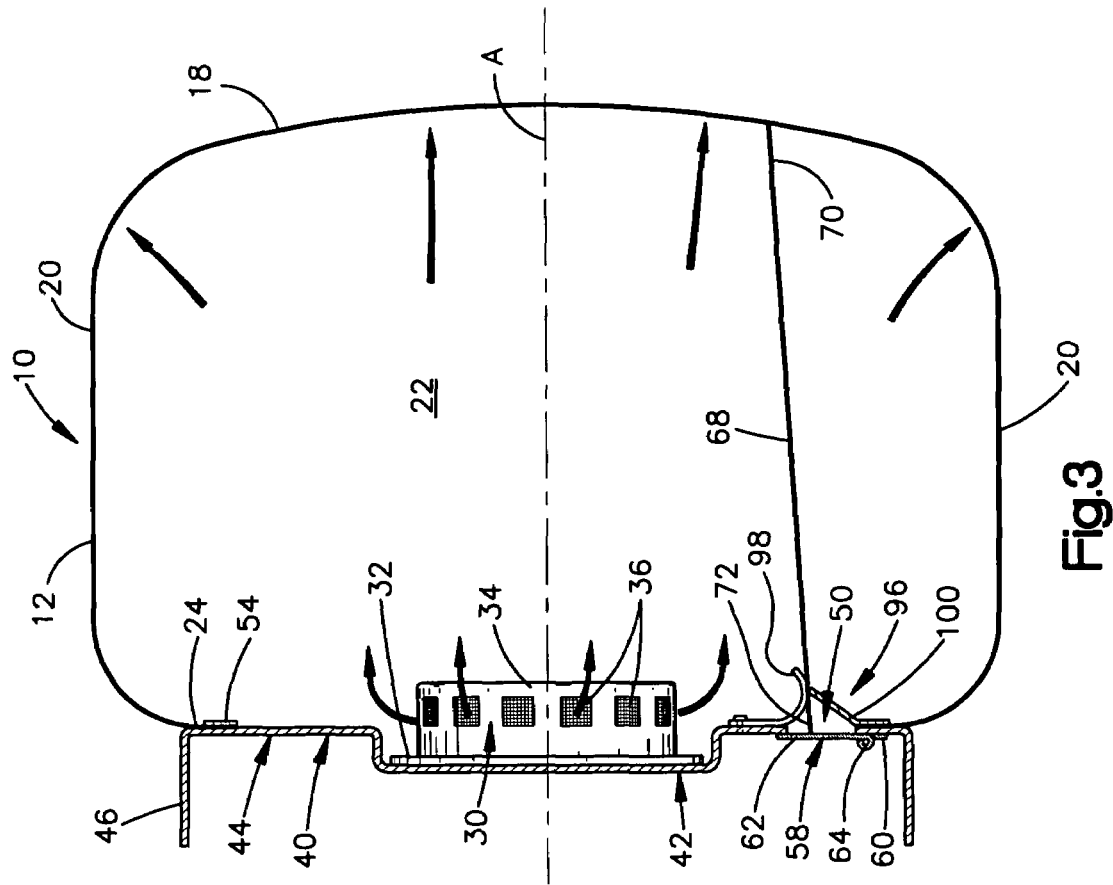

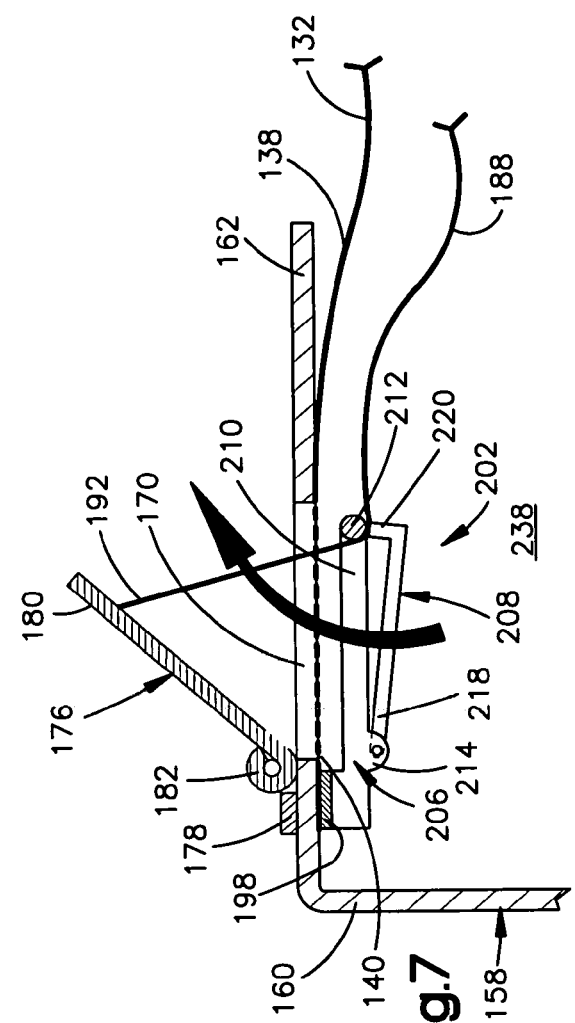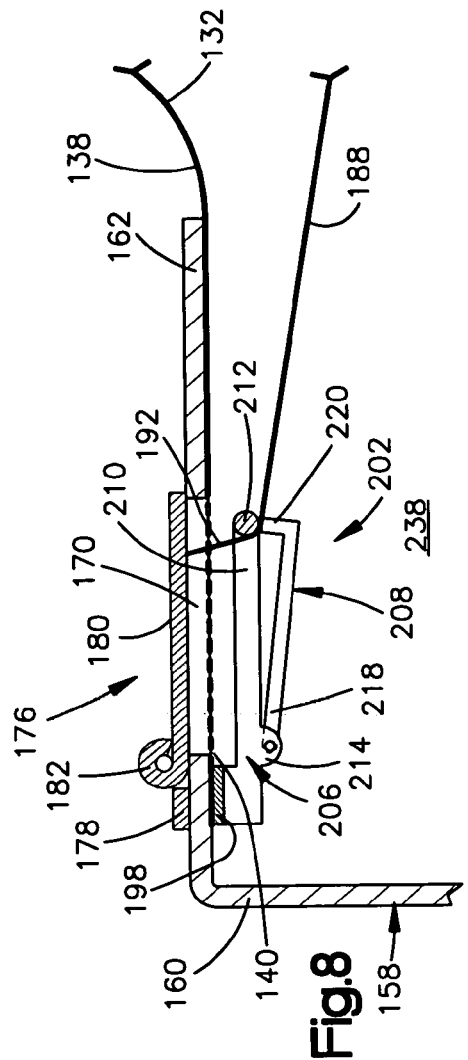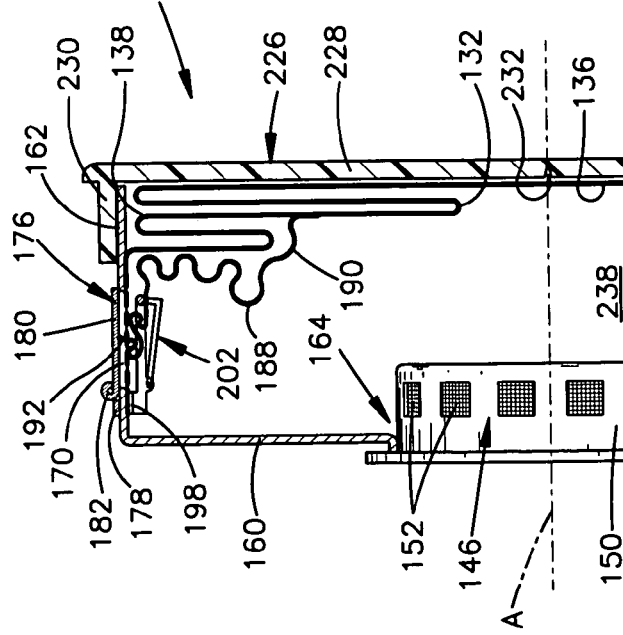

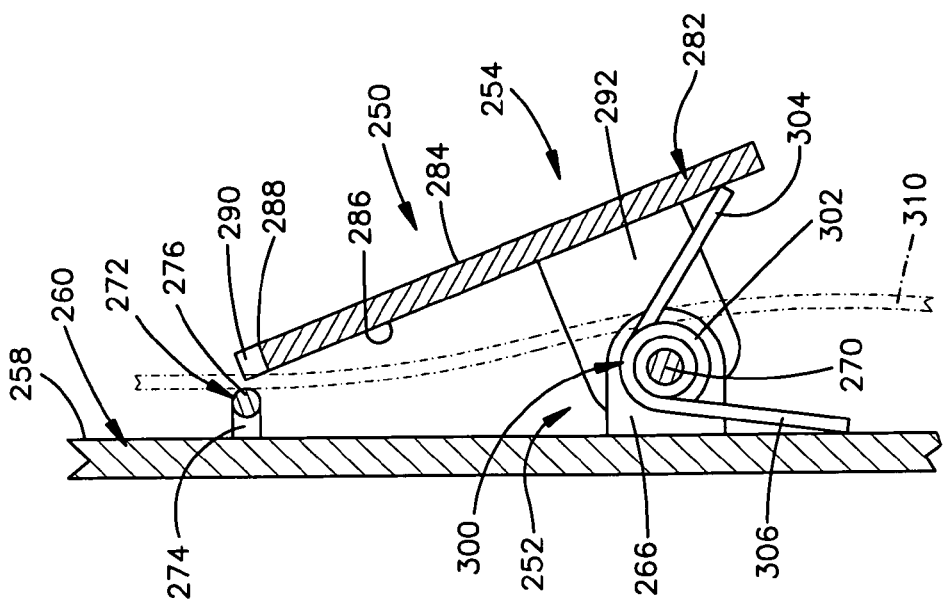
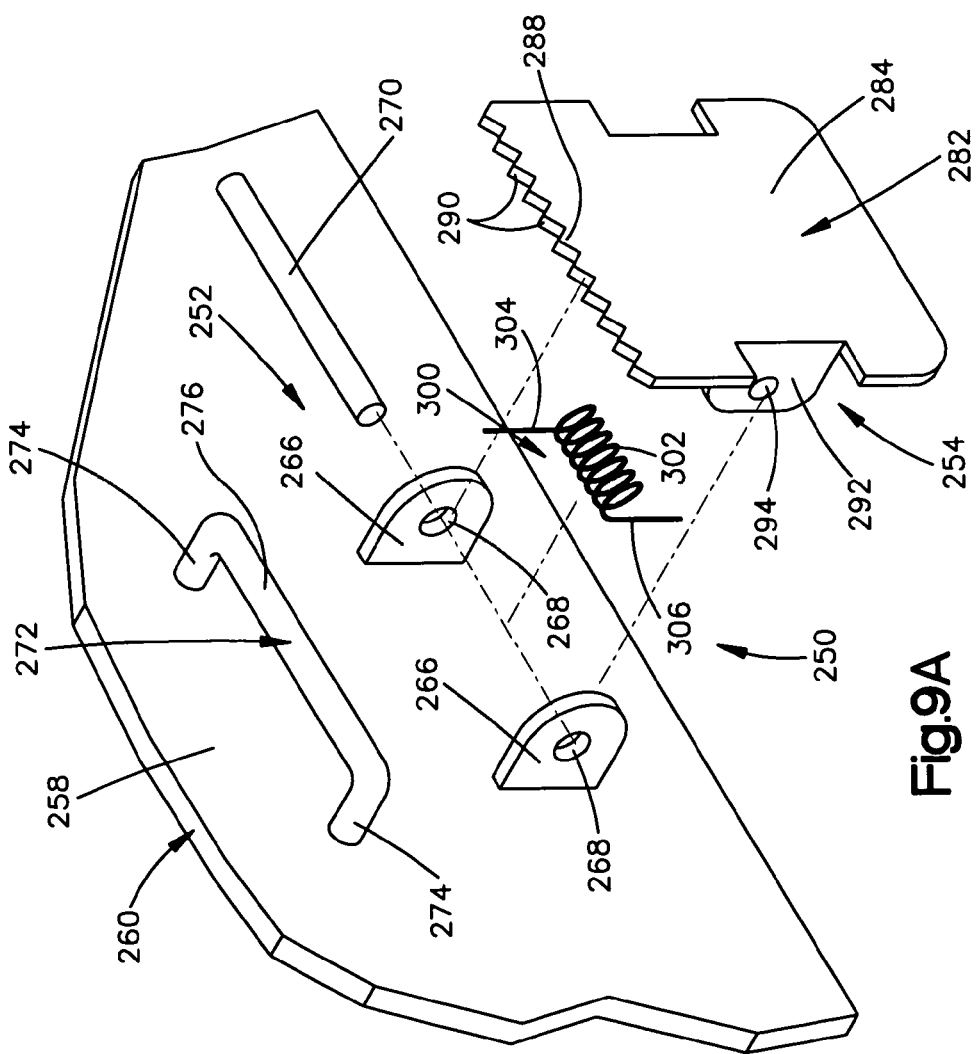
Fig.9A
Fig.9B

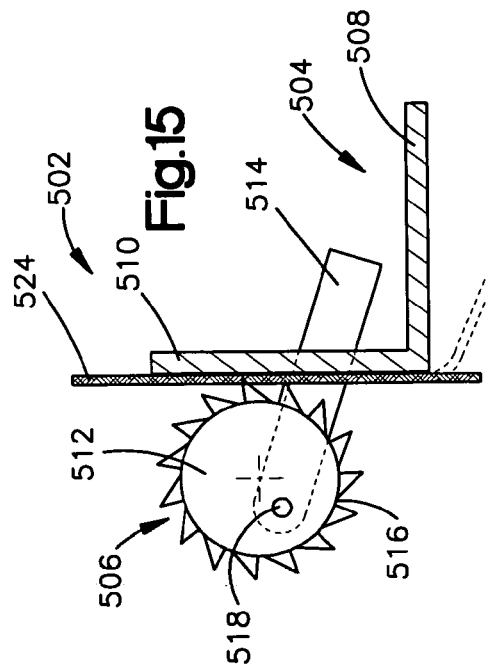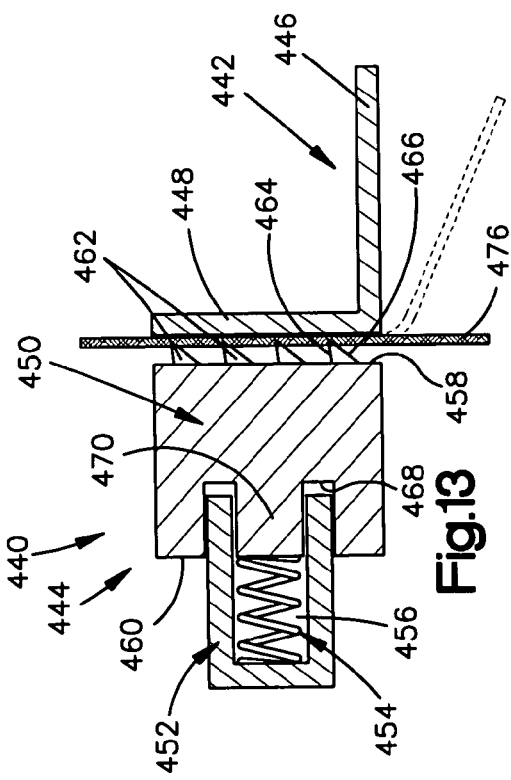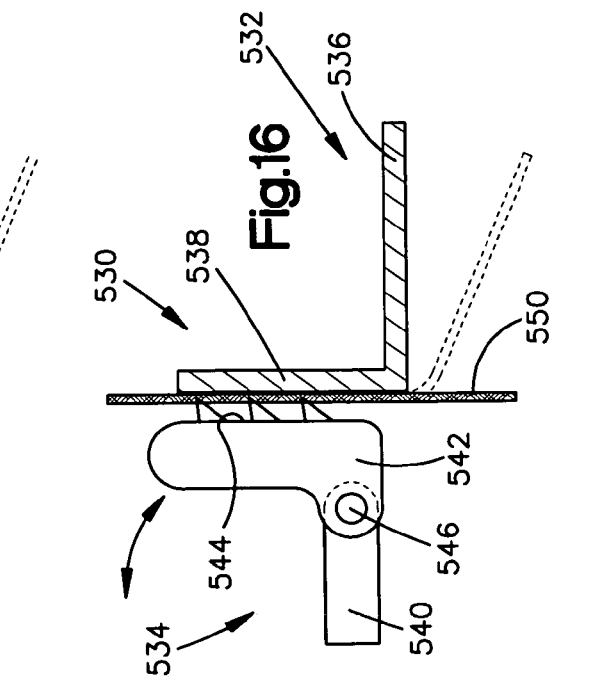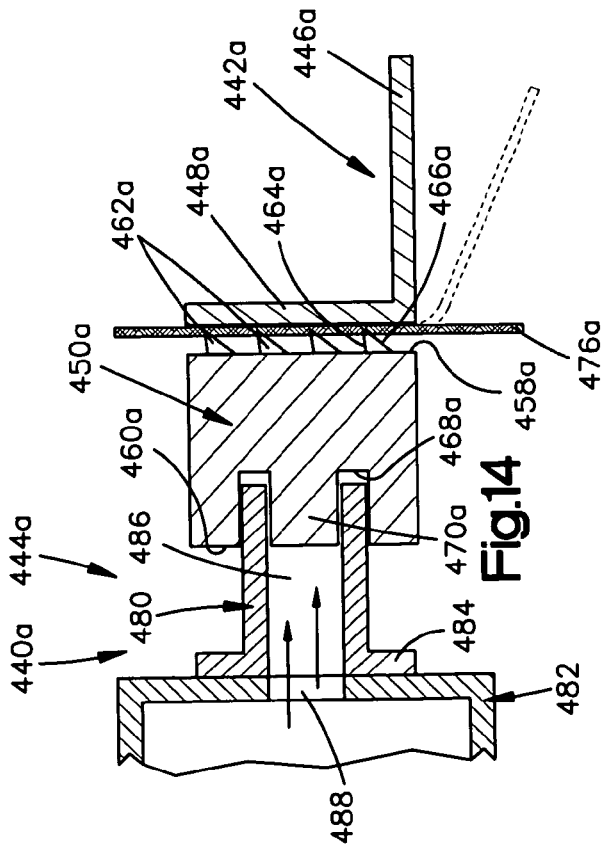

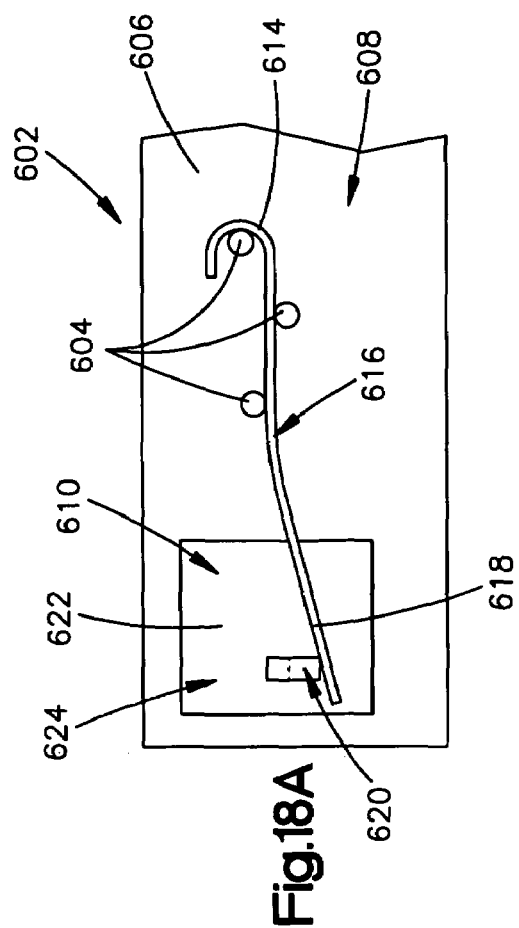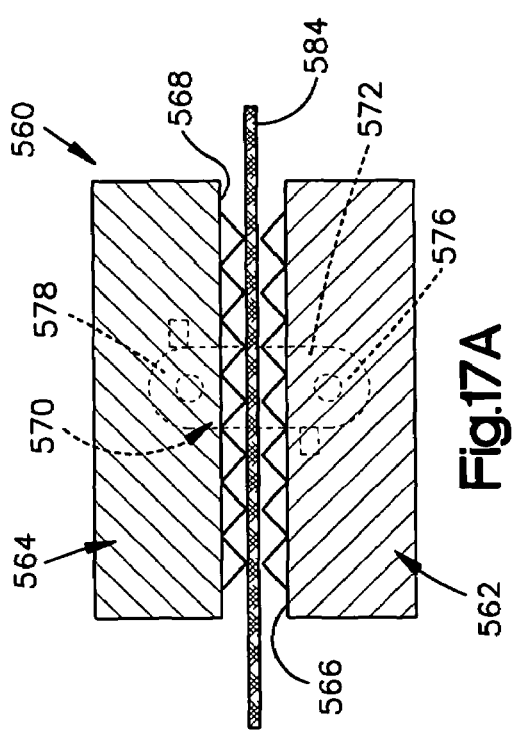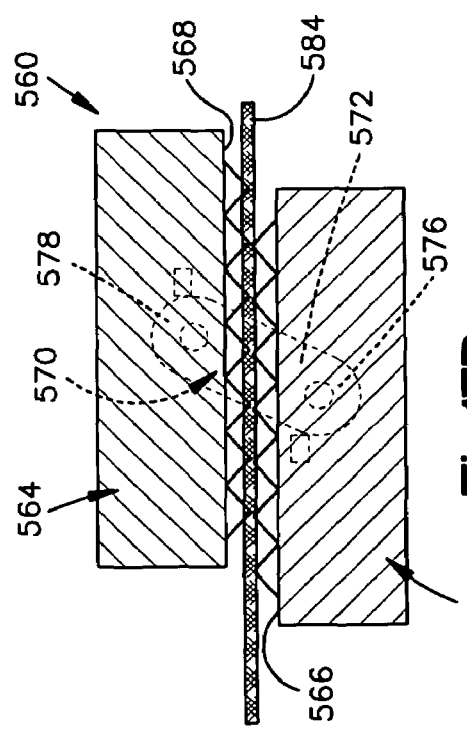

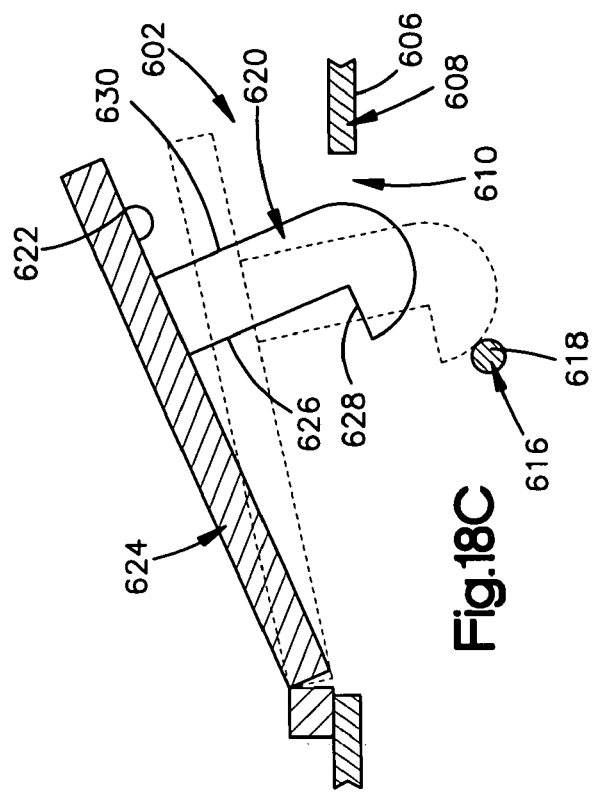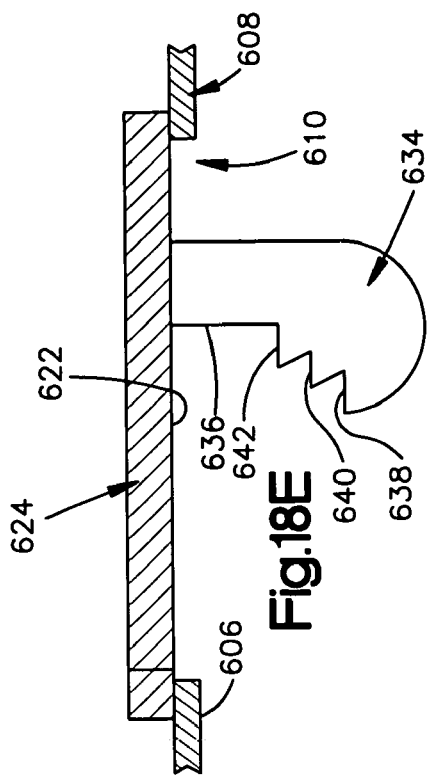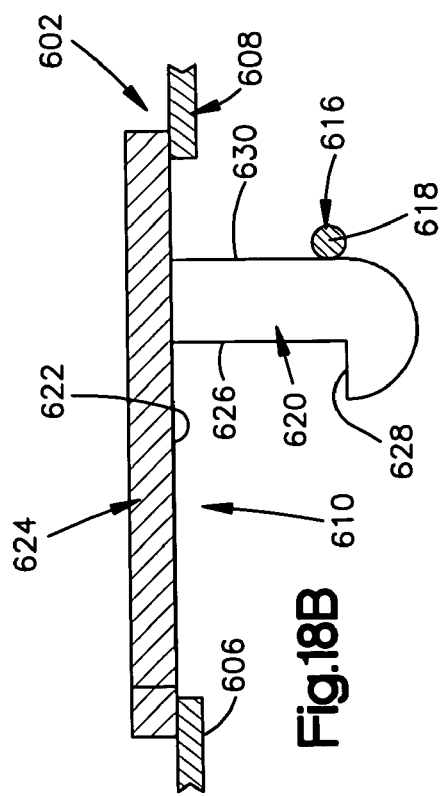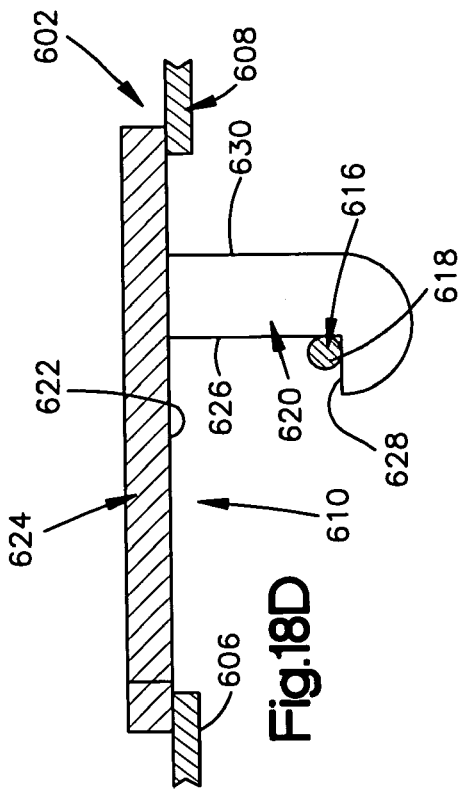

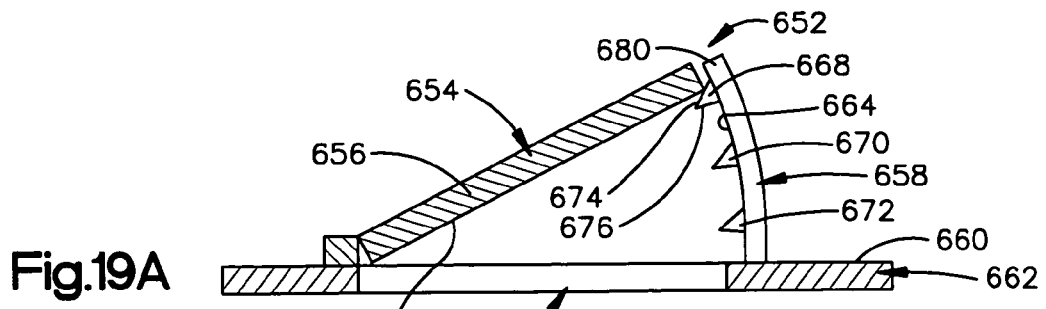
Fig.19A
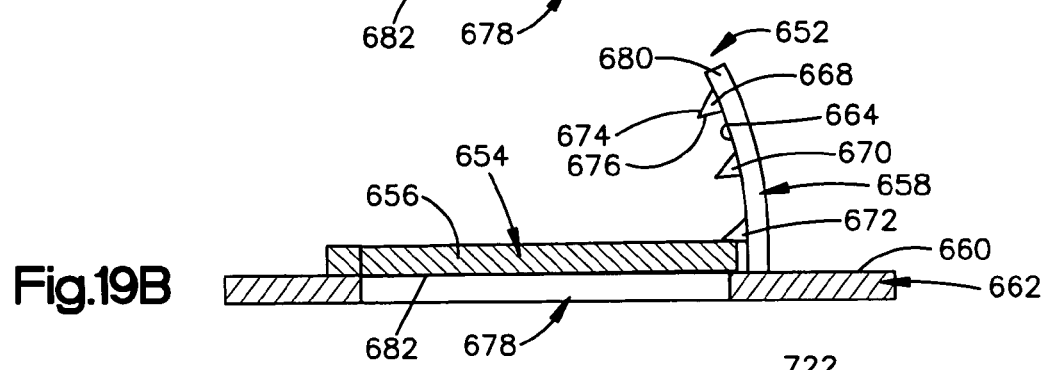
Fig.19B
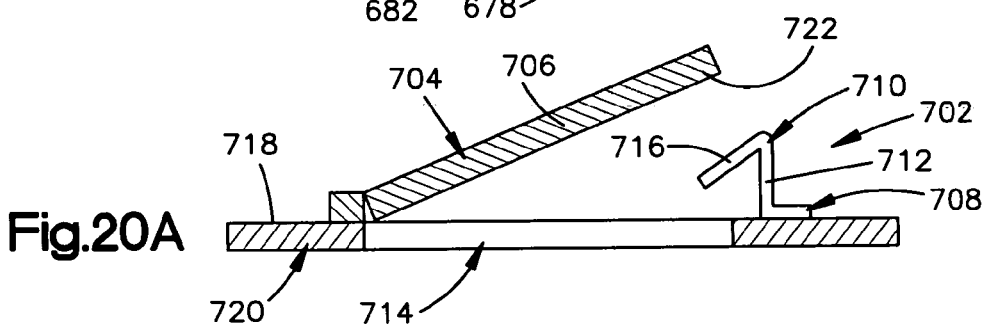
Fig.20A
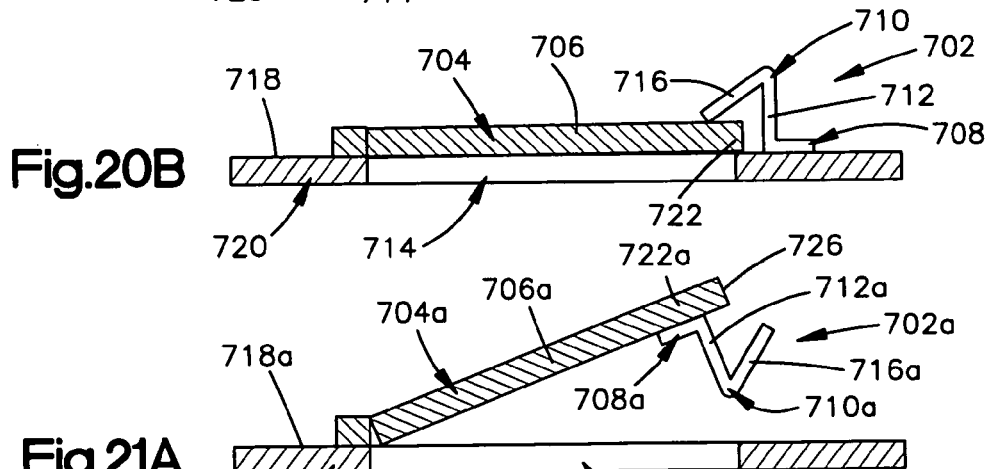
Fig.20B
Fig.21A
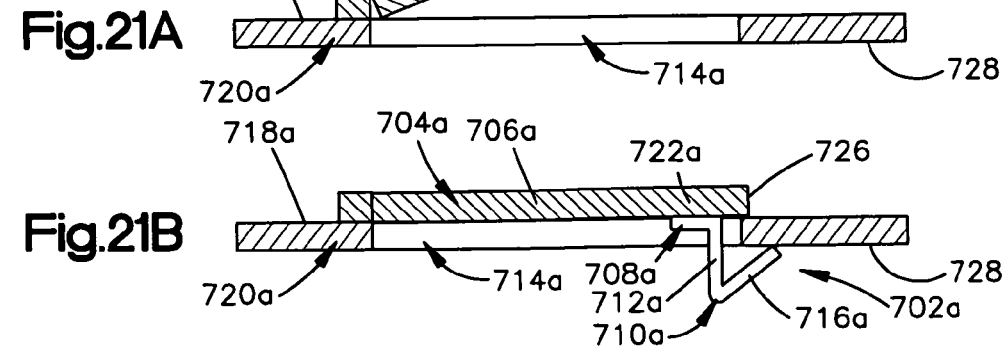
Fig.21B
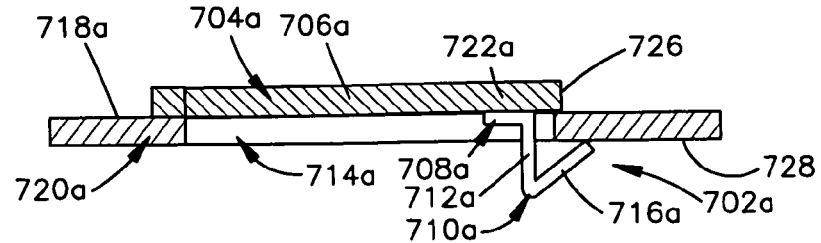

AIR BAG MODULE WITH LOCKING MEMBER FOR LOCKING THE POSITION OF A VENT MEMBER

RELATED APPLICATIONS

This application is a continuation-in-part of copending patent application Ser. No. 10/917,581, filed Aug. 13, 2004, which is a continuation-in-part of patent application Ser. No. 10/244,933, filed Sep. 16, 2002 now U.S. Pat. 7,083,191.

TECHNICAL FIELD

The present invention relates to a vehicle occupant protection apparatus. In particular, the present invention relates to an air bag module having a vent member that is moved during inflation of an air bag and a locking member for locking the position of the vent member.

BACKGROUND OF THE INVENTION

It is known to provide air bag modules with vent openings through which inflation fluid may be discharged. When an occupant of a vehicle is positioned too close to the air bag module and is contacted by an inflating air bag, the vent openings enable some inflation fluid to be discharged from the air bag to atmosphere. The discharge of inflation fluid through the vent openings helps reduce the contact force between the inflating air bag and the occupant.

It is also known to associate a vent door with each vent opening of an air bag module. A tether connects the vent door to a portion of the air bag. When the air bag inflates to a predetermined location, the tether pulls the vent door to block a flow of inflation fluid through the vent opening. United States Patent Application Publication No. 2004/0051285 A1, which is assigned to the assignee of the present invention, discloses an air bag module having a vent door that is closed by a tether.

The interaction of the occupant and the air bag may result in a sudden increase in the inflation fluid pressure within the air bag. The increased inflation fluid pressure tends to force the vent door open. When the vent door opens, the flow of inflation fluid from the air bag through the vent opening increases. If not impeded, the increased flow of inflation fluid through the vent opening may result in the pressure within the air bag becoming lower than desired for the air bag to restrain the occupant.

An inflatable vehicle occupant protection apparatus that permits the contact force between the inflating air bag and an occupant to be reduced without unduly lowering the pressure within the air bag is desired.

SUMMARY OF THE INVENTION

The present invention relates to a vehicle occupant protection apparatus comprising an inflatable occupant protection device and a vent opening through which inflation fluid may flow. The vehicle occupant protection apparatus also comprising a retainer to which the inflatable occupant protection device is secured. A vent member is movable relative to the vent opening for controlling a flow of inflation fluid through the vent opening. A tether is movable in response to inflation of the inflatable occupant protection device beyond a predetermined distance for moving the vent member. The vehicle occupant protection apparatus further comprising a tether guide member located on the retainer for guiding the tether.

In accordance with another aspect, the present invention relates to a vehicle occupant protection apparatus comprising an inflatable occupant protection device and a support member having a vent opening through which inflation fluid may flow. A bag retainer secures the inflatable occupant protection device relative to the support member. A vent member is movable relative to the support member for controlling a flow of inflation fluid through the vent opening. A tether extends between the inflatable occupant protection device and the vent member. The tether is responsive to inflation of the inflatable occupant protection device beyond a predetermined distance for moving the vent member. A tether guide member guides the tether between the inflatable vehicle occupant protection device and the vent member. The tether guide member is located on the bag retainer. The vehicle occupant protection apparatus also comprises a locking member for acting on the tether to block movement of the vent member for increasing the flow of inflation fluid through the vent opening after the inflatable occupant protection device has inflated beyond the predetermined distance.

In accordance with yet another aspect, the present invention relates to a vehicle occupant protection apparatus comprising an inflatable occupant protection device and a vent opening through which inflation fluid may flow. The vehicle occupant protection apparatus also comprises a retainer to which the inflatable occupant protection device is secured. A vent member is movable relative to the vent opening for controlling a flow of inflation fluid through the vent opening. A tether is movable in response to inflation of the inflatable occupant protection device beyond a predetermined distance for moving the vent member. The vehicle occupant protection apparatus further comprises a locking member for acting on the tether to block movement of the vent member that would otherwise increase the flow of inflation fluid through the vent opening after the inflatable occupant protection device has inflated beyond the predetermined distance. The locking member is located on the retainer.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a sectional view of a vehicle occupant protection apparatus constructed in accordance with the present invention and with a vent member in a closed position prior to actuation of an inflator;

FIG. 2 is a sectional view of the vehicle occupant protection apparatus of FIG. 1 after actuation of the inflator and with the vent member in an open position;

FIG. 3 is a sectional view of the vehicle occupant protection apparatus of FIG. 1 after actuation of the inflator and with the vent member moved back to the closed position;

FIG. 4 is a top view of a locking member of the vehicle occupant protection apparatus of FIG. 1;

FIG. 5 is top view of a first alternative locking member;

FIG. 6 is a sectional view of a vehicle occupant protection apparatus constructed in accordance with a second embodiment of the present invention and with a vent member in a closed position prior to actuation of an inflator;

FIG. 7 is an enlarged view of a portion of the vehicle occupant protection apparatus of FIG. 6 after actuation of the inflator and with the vent member in an open position;

FIG. 8 is an enlarged view of a portion of the vehicle occupant protection apparatus of FIG. 6 after actuation of the inflator and with the vent member moved back to the closed position;

FIGS. 9A and 9B illustrate a second alternative locking member;

FIG. 13 illustrates a sixth alternative locking member;

FIG. 14 illustrates a seventh alternative locking member;

FIG. 15 illustrates an eighth alternative locking member;

FIG. 16 illustrates a ninth alternative locking member;

FIGS. 17A and 17B illustrate a tenth alternative locking member;

FIGS. 18A-E illustrate an eleventh alternative locking member;

FIGS. 19A and 19B illustrate a twelfth alternative locking member;

FIGS. 20A and 20B illustrate a thirteenth alternative locking member;

FIGS. 21A and 21B illustrate a fourteenth alternative locking member;

DETAILED DESCRIPTION OF THE INVENTION

Figure 10A:
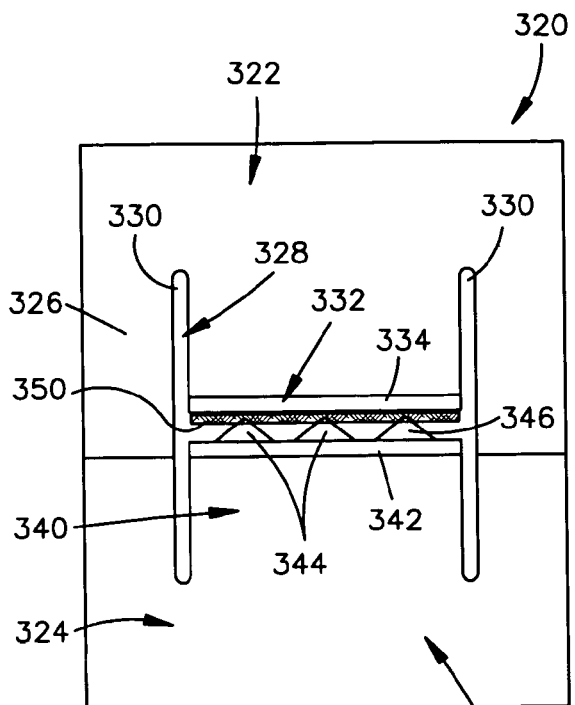
FIGS. 10A and 10B illustrate a third alternative locking member.

FIG. 1 is a sectional view of a vehicle occupant protection apparatus 10 constructed in accordance with the present invention. The vehicle occupant protection apparatus 10 of FIG. 1 is an air bag module. The air bag module 10 includes an inflatable occupant protection device in the form of an air bag 12. As an alternative to an air bag, the inflatable occupant protection device may be, for example, an inflatable seat belt, an inflatable knee bolster, an inflatable head liner, an inflatable side curtain, or a knee bolster operated by one or more inflatable air bags.

The air bag 12 is preferably made from a flexible fabric material, such as woven nylon. The air bag 12 can alternatively be made from a non-woven material, such as plastic film. The air bag 12 has a deflated and stored condition in which the air bag is packed and stored within the air bag module 10, as shown in FIG. 1. In response to receiving inflation fluid, the air bag 12 inflates from the deflated and stored condition to an inflated condition, shown in FIG. 3.

The air bag 12 includes an outer panel 18 and side panels 20 that collectively define an inflatable volume 22 (FIG. 3) of the air bag. Ends of the side panels 20 opposite the outer panel 18 define a mouth portion 24 of the air bag. Inflation fluid flows through the mouth portion 24 of the air bag 12 and into the inflatable volume 22 for inflating the air bag from the deflated and stored condition to the inflated condition.

The air bag module 10 of FIG. 1 is designed for a driver side application. The air bag module 10 is sized and shaped to be mounted on a hub (not shown) of a vehicle steering wheel (not shown). The present invention also is applicable to air bags that are used in other vehicle locations, such as, for example, a passenger side air bag as is described below with reference to FIG. 6, or any other air bag at any location.

The air bag module 10 includes an inflator 30 that is actuatable for providing inflation fluid. Any type of known inflator may be used with the air bag module 10 of the present invention. The inflator 30 illustrated in FIGS. 1-3 includes a circular base portion 32 and a cylindrical housing portion 34. Flow passages 36 extend through the housing portion 34 of the inflator 30. When the inflator 30 is actuated, inflation fluid flows out of the inflator through the flow passages 36.

The air bag module 10 also includes a reaction plate 40. When the air bag module 10 is installed in a vehicle, the reaction plate 40 is fixed to the vehicle. The reaction plate 40 receives the reaction forces associated with actuation of the inflator 30 and inflation of the air bag 12.

The reaction plate 40 is formed from a single piece of material, such as metal or high strength plastic. The reaction plate 40 is generally disk-shaped and includes a recessed central portion 42. An annular portion 44 of the reaction plate 40 surrounds the central portion 42. The annular portion 44 extends radially relative to axis A. An edge of the annular portion 44 opposite the central portion 42 includes a flange 46. The flange 46 extends axially parallel to axis A and in the same direction relative to the annular portion 44 as the central portion 42 of the reaction plate 40.

A vent opening 50 (FIG. 2) extends through the annular portion 44 of the reaction plate 40. The vent opening 50 enables inflation fluid flow through the reaction plate 40. The reaction plate 40 may have any number of vent openings 50. FIGS. 1-3 illustrate the reaction plate 40 as having only a single vent opening 50. In the air bag module 10 illustrated in FIGS. 1-3, the vent opening 50 is located in the annular portion 44 at a location below, as viewed in FIGS. 1-3, the central portion 42 of the reaction plate 40. The vent opening 50 is generally rectangular, although the vent opening may have any shape.

The reaction plate 40 supports the inflator 30 and the air bag 12. The base portion 32 of the inflator 30 is fixed to the central portion 42 of the reaction plate 40 in a known manner, such as by fasteners (not shown). An air bag retainer 54 fixes the mouth portion 24 of the air bag 12 to the reaction plate 40. In the air bag module 10 illustrated in FIGS. 1-3, the air bag retainer 54 attaches the mouth portion 24 of the air bag 12 to the annular portion 44 of the reaction plate 40 at a location radially outside, relative to axis A, the vent opening 50. Alternatively, the air bag retainer 54 may attach the mouth portion 24 of the air bag 12 at a location radially inside, relative to axis A, the vent opening 50. When the mouth portion 24 is attached at a location radially inside the vent opening 50, a side panel 20 of the air bag 12 includes at least one flow opening that aligns with the vent opening 50 for enabling inflation fluid flow out of the air bag and through the vent opening.

A vent member 58 is associated with the vent opening 50. The vent member 58 is a generally rectangular plate that is sized for overlying the vent opening 50. The vent member 58 illustrated in FIGS. 1-3 includes an attaching portion 60 and a closing portion 62. A hinge area 64 separates the attaching portion 60 and the closing portion 62 and enables the closing portion to move relative to the attaching portion. The hinge area 64 may be a separate piece of the same or a different material. Alternatively, the hinge area 64 may be integrated either with the closing portion 60 of the vent member 58 or the annular portion 44 of the reaction plate 40.

The attaching portion 60 of the vent member 58 is fixed to the annular portion 44 of the reaction plate 40 in a location radially outward of, relative to axis A, and adjacent to the vent opening 50. When the attaching portion 60 of the vent member 58 is attached to the reaction plate 40, the closing portion 62 of the vent member 58 overlies the vent opening 50.

A tether 68 connects the air bag 12 and the closing portion 62 of the vent member 58. In the illustrated embodiment, the tether 68 is a narrow, elongate piece of woven nylon material. The tether 68 has a first end portion 70 that is attached by any means, such as sewing or gluing, to the outer panel 18 of the air bag 12 and an opposite second end portion 72 that is fixed to the closing portion 62 of the vent member 58. The tether 68 is pulled taut during inflation of the air bag 12 and, when pulled taut, transfers a force from the air bag to the vent member 58, as will be described below.

The air bag module 10 also includes a cover 14 (FIG. 1). For simplicity of the illustrations, the cover 14 of the air bag module 10 is shown in FIG. 1 and is omitted from FIGS. 2 and 3. The cover 14 includes a front panel 78 and side panels 80. The front panel 78 of the cover 14 includes a tear seam 82 that ruptures to enable deployment of the air bag 12 from the air bag module 10. The side panels 80 of the cover 14 extend perpendicularly from the front panel 78. An end portion 84 of each side panel 80 is located radially outwardly of the flange 46 of the reaction plate 40 and is fixed to the reaction plate in a known manner, such as with fasteners (not shown).

A chamber 90 (FIG. 1) is defined in the air bag module 10 between the cover 14 and the reaction plate 40. When the air bag module 10 is in a non-actuated condition, as shown in FIG. 1, the deflated air bag 12 is folded and stored in the chamber 90. When stored in the chamber 90, the outer panel 18 of the air bag 12 is adjacent the front panel 78 of the cover 14. Also when the air bag module 10 is in the non-actuated condition, there is a significant amount of slack in the tether 68. The slack is present because the length of the tether 68 is greater than the distance between the portion of the outer panel 18 of the air bag 12 to which the first end portion 70 of the tether is fixed and the vent member 58 to which the second end portion 72 of the tether is attached.

When the air bag module 10 is in the non-actuated condition, as is shown in FIG. 1, the vent member 58 is in a closed position closing the vent opening 50. When the vent member 58 is in the closed position, debris and other foreign matter are prevented from entering the chamber 90 of the air bag module 10 through the vent opening 50. In a preferred embodiment of the present invention, the vent member 58 of the air bag module 10 is in the closed position prior to actuation of the inflator 30.

When the inflator 30 of the air bag module 10 is actuated, inflation fluid exits the inflator 30 and begins to pressurize the air bag 12. In response to receiving inflation fluid from the inflator 30, the air bag 12 expands within the chamber 90 and begins to press against the front panel 78 of the cover 14. As additional inflation fluid enters the air bag 12, the pressure within the air bag 12 increases. The pressure within the chamber 90 also acts on the vent member 58. Since an exterior surface of the vent member 58 is subject to atmospheric pressure, a pressure differential arises across the closing portion 62 of the vent member 58. When the pressure differential reaches a predetermined level, the vent member 58 bends at its hinge 64 and the closing portion 62 moves away from the vent opening 50. Thus, in response to the pressure differential, the vent member 58 moves from the closed position, shown in FIG. 1, to the open position, shown in FIG. 2. When the vent member 58 is in the open position, some inflation fluid may flow out of the air bag 12 through the vent opening 50.

At the point of air bag deployment illustrated in FIG. 2, the output of inflation fluid from the inflator 30 is greater than the amount of inflation fluid that may exit the air bag 12 through the vent opening 50. As a result, the pressure within the air bag 12 continues to increase after the vent member 58 is moved to the open position. The increasing pressure in the air bag 12 results in an increasing pressure that is applied to the front panel 78 of the cover 14. The increasing pressure that is applied to the front panel 78 of the cover 14 eventually ruptures the tear seam 82 of the front panel of the cover and enables the air bag 12 to expand outwardly of the chamber 90 of the air bag module 10.

As the air bag 12 inflates, the outer panel 18 of the air bag 12 moves away from the reaction plate 40 and away from the vent member 58. If the outer panel 18 moves away from the reaction plate 40 by less than a predetermined distance, slack remains in the tether 68. The outer panel 18 of the air bag 12 may move away from the reaction plate 40 by less than the predetermined distance, for example, if the air bag when inflating engages a vehicle occupant who is positioned relatively close to the reaction plate 40. The engagement of the air bag 12 with the relatively close vehicle occupant stops or limits the movement of the outer panel 18 of the air bag away from the reaction plate 40 and away from the vent member 58.

When slack remains in the tether 68 as a result of the outer panel 18 moving away from the reaction plate 40 by less than the predetermined distance, the tether 68 does not pull on the vent member 58 and the vent member remains in the open position, spaced apart from the vent opening 50. The vent opening 50 remains open, enabling the flow of inflation fluid away from the air bag 12 through the vent opening 50 and to atmosphere. This venting of the air bag 12 can reduce the force and pressure with which the air bag inflates.

When the outer panel 18 of the air bag 12 moves away from the reaction plate 40 by more than the predetermined distance, the slack is completely removed from the tether 68 and the tether is tensioned. The tensioned tether 68 pulls the vent member 58 from the open position, shown in FIG. 2, back toward the closed position in which the vent member blocks the flow of inflation fluid through the vent opening 50. When the vent member 58 is moved back into the closed position during inflation of the air bag 12, as is shown in FIG. 3, the air bag 12 continues to inflate with full force and pressure.

The air bag module 10 also includes a locking member 96. The locking member 96 prevents the closing portion 62 of the vent member 58 from moving toward the open position after the closing portion of the vent member has been moved from the open position, shown in FIG. 2, toward the closed position, shown in FIG. 3. FIG. 4 illustrates a top view of the locking member 96. A side view of the locking member 96 can be seen in FIGS. 1-3. The locking member 96 illustrated in FIGS. 1-4 acts on the tether 68 to prevent movement of the tether through the locking member in a direction toward the vent member 58, i.e., leftward, as viewed in FIGS. 1-3.

The locking member 96 includes a guide portion 98 and a lock portion 100. Preferably, the guide portion 98 and the lock portion 100 of the locking member 96 are made from steel. Materials other than steel, such as, for example, plastic, may be used for forming the locking member 96.

As shown in FIG. 4, the guide portion 98 includes a generally planar base wall 104. The base wall 104 has a generally trapezoidal shape. Holes (not shown) for receiving fasteners, such as rivets, extend through the base wall 104 for enabling the guide portion 98 to be fixed to the reaction plate 40. A guide wall 106 curves outwardly of the base wall 104 so that an end 108 of the guide wall opposite the base wall extends over a portion of the base wall. As shown in FIG. 4, two side walls 110 extend outwardly of the guide wall 106 in a direction opposite the base wall 104. The side walls 110 are located on laterally opposite sides of the guide wall 106.

The guide wall 106 and the two side walls 110 define a channel through which the tether 68 extends. The guide wall 106 supports the tether 68 during movement of the tether relative to the guide portion 98 of the locking member 96 and the side walls 110 prevent movement of the tether laterally off of the guide wall.

The lock portion 100 is a one-piece structure. The lock portion 100 is formed from a resilient material. When the lock portion 100 and the guide portion 98 are made from the same material, for example, steel, the lock portion 100 is formed with a material thickness that is less than that of the guide portion 98 so that the lock portion is generally resilient and the guide portion is generally rigid.

The lock portion 100 includes a generally planar base wall 116. As shown in FIG. 4, the base wall 116 has a generally rectangular shape. Holes 118 for receiving fasteners, such as rivets, extend through the base wall 116 for enabling the lock portion 100 to be fixed to the reaction plate 40. A clamping wall 120 extends outwardly of the base wall 116 at an obtuse angle relative to the base wall. As shown in FIG. 4, an end 122 of the clamping wall 120 opposite the base wall 116 includes teeth 124. The teeth 124 are adapted to grip the tether 68.

The locking member 96 is fixed to the reaction plate 40 within the chamber 90 of the air bag module 10 and adjacent the vent opening 50. The guide portion 98 of the locking member 96 is located on one side of the vent opening 50 and the lock portion 100 of the locking member is located on an opposite side of the vent opening. In the embodiment illustrated in FIGS. 1-3, the guide portion 98 of the locking member 96 is located adjacent an upper side of the vent opening 50 and the lock portion 100 is located adjacent a lower side of the vent opening. When fixed to the reaction plate 40, the lock portion 100 is positioned in a location relative to the guide portion 98 such that the teeth 124 of the clamping wall 120 of the lock portion are located between the side walls 110 and are adjacent to the guide wall 106 of the guide portion.

During assembly of the air bag module 10, the tether 68 is passed through the locking member 96 between the guide portion 98 and the lock portion 100. When passing through the locking member 96, the tether 68 lies on the guide wall 106 of the guide portion 98 and the teeth 124 of the clamping wall 120 of the lock portion 100 engage the tether and press the tether against the guide wall.

As set forth above, the locking member 96 prevents movement of the tether 68 through the locking member in a direction toward the vent member 58, i.e., leftward, as viewed in FIGS. 1-3. When a force acts to pull the tether 68 through the locking member 96 in a direction toward the vent member 58, the teeth 124 of the lock portion 100 grip the tether 68. The force thus pulls the clamping wall 120 of the lock portion toward the guide wall 106 of the guide portion 98 to lock the tether between the lock portion and the guide portion. When a force acts to pull the tether 68 through the locking member 96 in a direction toward the outer panel 18 of the air bag 12, the force causes the clamping wall 120 of the lock portion 100 to bend so that the teeth 124 move away from the guide wall 106 of the guide portion 98. As a result, the tether 68 may move through the locking member 96 toward the outer panel 18 of the air bag 12. Thus, the locking member 96 prevents tether 68 travel in a first direction toward the vent member 58 and allows tether travel in a second direction toward the outer panel 18 of the air bag 12.

When the air bag module 10 is unactuated, as illustrated in FIG. 1, slack is present in the tether 68. During assembly of the air bag module 10, a predetermined amount of the tether 68 is located between the vent member 58 and the locking member 96. The remainder of the tether 68 is located between the locking member 96 and the outer panel 18 of the air bag 12. The predetermined amount of the tether 68 is an amount sufficient for slack to be present between the vent member 58 and the locking member 96 and, as will described below, is chosen to control the location of the open position of the vent member 58.

To aid in providing the predetermined amount of the tether 68 between the vent member 58 and the locking member 96 during assembly, the tether 68 may include a tether positioning aid (not shown). The tether positioning aid may be a knot that is formed in the tether 68. Alternatively, the tether positioning aid may be markings on the tether 68, or a member that is sewn or otherwise fixed to the tether.

When the inflator 30 of the air bag module 10 is actuated, the inflation fluid pressure within the air bag 12 acts on the vent member 58 and moves the vent member from the closed position, shown in FIG. 1, to the open position, shown in FIG. 2. When the vent member 58 is in the open position, the predetermined amount of the tether 68 located between the vent member 58 and the locking member 96 is pulled taut, as shown in FIG. 2. Since the locking member 96 prevents movement of the tether 68 toward the vent member 58, the tautness of predetermined amount of the tether 68 prevents further movement of the vent member 58. Thus, the locking member 96 and the predetermined amount of the tether 68 control the open position of the vent member 58 and control the amount of fluid that may flow out of the chamber 90 through the vent opening 50 when the vent member 58 is in the open position.

When the outer panel 18 of the air bag 12 moves away from the reaction plate 40 by the predetermined distance, the slack is completely removed from the tether 68 and the tether is tensioned. Further movement of the outer panel 18 of the air bag 12 away from the reaction plate 40 acts to pull the tether 68 through the locking member 96 in the direction of the outer panel, i.e., rightward, as viewed in FIGS. 1-3. The movement of the tether 68 pulls the vent member 58 from the open position, shown in FIG. 2, back toward the closed position in which the vent member blocks the flow of inflation through the vent opening 50.

FIG. 3 illustrated the vent member 58 back in the closed position. When the air bag module 10 of the present invention is actuated for helping to protect an occupant of a vehicle, the vent member 58 may be at any position along a path traveled by the vent member between the open and closed positions when occupant interaction with the air bag 12 prevents further movement of the outer panel 18 of the air bag away from the reaction plate 40. The interaction between the occupant and the air bag 12 may result in an increase in pressure within the air bag that tends to force the vent member 58 away from the reaction plate 40 and back toward the open position. By preventing the tether 68 from moving toward the vent member 58, the locking member 96 prevents the movement of the vent member 58 back toward the open position. Thus, the locking member 96 blocks movement of the vent member 58 that would increase a flow of inflation fluid through the vent opening 50 and reduce pressure in the air bag 12. As a result, the locking member 96 helps to maintain pressure within the air bag 12.

The locking member 96 prevents the movement of the vent member 58 back toward the open position regardless of the position of the vent member along the path between the open and closed positions at the occurrence of the interaction between the occupant and the air bag 12. Thus, the locking member 96 may be referred to as being "infinitely adjustable" as the locking member prevents movement of the vent member 58 at all positions of the vent member between the open and closed positions.

FIG. 5 is top view of a first alternative locking member 96a that may be used with the air bag module of FIGS. 1-3. Structures of the locking member 96a of FIG. 5 that are the same as or similar to those described with reference to the locking member 96 of FIGS. 1-4 are labeled with the same reference numbers as in FIGS. 1-4 with the addition of the suffix "a".

The locking member 96a of FIG. 5 is identical to the locking member 96 of FIGS. 1-4 with the exception that the clamping wall 120a of the lock portion 100a of the locking member 96a of FIG. 5 does not include teeth 124. Instead, in FIG. 5, the end 122a of the clamping wall 120a opposite the base wall 116a terminates in a flat surface. The locking member 96a of FIG. 5 operates in substantially the same manner as the locking member 96 of FIGS. 1-4. When a force acts to pull the tether through the locking member 96a in a direction toward the vent member, the tether engages the flat surface of the end 122a of the clamping wall 120a of the lock portion 100a and pulls the clamping wall toward the guide wall 106a of the guide portion 98a to lock the tether in between the lock portion and guide portion. When a force acts to pull the tether through the locking member 96a in a direction toward the outer panel of the air bag, the force causes the clamping wall 120a of the locking member 100a to bend so that the flat surface of the end 122a of the clamping wall 120a moves away from the guide wall 106a of the guide portion 98a. This enables the tether to move through the locking member 96a toward the outer panel of the air bag.

FIG. 6 is a sectional view of a vehicle occupant protection apparatus 130 constructed in accordance with a second embodiment of the present invention. The vehicle occupant protection apparatus 130 of FIG. 6 is also an air bag module. The air bag module 130 of FIG. 6 is a passenger side air bag module.

The air bag module 130 includes an inflatable occupant protection device in the form of an air bag 132. The air bag 132 is preferably made from a flexible fabric material, such as woven nylon. The air bag 132 has a deflated and stored condition in which the air bag is packed within the air bag module 130. In response to receiving inflation fluid, the air bag 132 inflates from the deflated and stored condition, shown in FIG. 6, to an inflated condition (not shown).

The air bag 132 includes an outer panel 136 and side panels 138 that collectively define an inflatable volume of the air bag. Ends of the side panels 138 opposite the outer panel 136 define a mouth portion 140 of the air bag 132. Inflation fluid flows through the mouth portion 140 of the air bag 132 and into the inflatable volume for inflating the air bag from the deflated and stored condition to the inflated condition. The side panels 138 also include flow openings, shown by dashed lines in FIGS. 6-8.

The air bag module 130 includes an inflator 146 that is actuatable for providing inflation fluid. The inflator 146 includes a circular base portion 148 and a cylindrical housing portion 150. Flow passages 152 extend through the housing portion 150 of the inflator 146. When the inflator 146 is actuated, inflation fluid flows out of the inflator 146 through the flow passages 152.

The air bag module 130 also includes a reaction can 158. When the air bag module 130 is installed in a vehicle, the reaction can 158 is fixed relative to the vehicle. The reaction can 158 receives the reaction forces associated with actuation of the inflator 146 and inflation of the air bag 132.

The reaction can 158 is formed from a single piece of material, such as metal or high strength plastic. The reaction can 158 has a rectangular end wall 160 and four side walls. FIG. 6 illustrates two of the four side walls at 162. A circular inflator opening 164 extends through the end wall 160 of the reaction can 158. A flange 166, that extends parallel to axis A, defines the inflator opening 164. The inflator opening 164 is sized to receive the housing portion 150 of the inflator 146. When the inflator 146 is positioned in the inflator opening 164, the base portion 148 of the inflator 146 abuts the flange 166. The inflator 146 is fixed to the reaction can 158 in a known manner, such as by fasteners (not shown).

The reaction can 158 also includes vent openings 170. The vent openings 170 are located in the side walls 162 of the reaction can 158. FIG. 6 illustrates two vent openings 170. The vent openings 170 illustrated in FIG. 6 are generally rectangular, although the vent opening may have any shape.

Each vent opening 170 has an associated vent member 176. The vent members 176 are generally rectangular plates that are sized for overlying the vent openings 170. The vent members 176 illustrated in FIG. 6 includes an attaching portion 178 and a closing portion 180. A hinge 182 separates the attaching portion 178 and the closing portion 180 and enables the closing portion to move relative to the attaching portion.

The attaching portion 178 of each vent member 176 is fixed to the reaction can 158 in a location adjacent to an associated vent opening 170. When the attaching portion 178 of each vent member 176 is attached to the reaction can 158, the closing portion 180 of each vent member 176 overlies the vent opening 170.

A tether 188 extends between the air bag 132 and the closing portion 180 of each vent member 176. Each tether 188 has a first end portion 190 that is sewn to the outer panel 136 of the air bag 132 and an opposite second end portion 192 that is fixed to the closing portion 180 of the vent member 176. The tethers 188 are pulled taut during inflation of the air bag 132 as a result of the outer panel 136 of the air bag moving relative to the reaction can 158 by more than a predetermined distance. When pulled taut, the tethers 188 transfer a force from the air bag to the vent members 176. The two tethers 188 of FIG. 6 preferably have the same length. Tethers having different lengths may also be used. When the tethers 188 have different lengths, the vent members 176 close at different times during inflation of the air bag 132.

A bag retainer 198 fixes the mouth portion 140 of the air bag 132 relative to the reaction can 158. The bag retainer 198 has a rectangular configuration and is sized to be secured to interior surfaces of the side walls 162 of the reaction can 158. As shown in FIG. 6, the bag retainer 198 is fixed to the side walls 162 of the reaction can 158 at a location adjacent the end wall 160 of the reaction can. The side panel 138 of the air bag 132 extends over the vent openings 170. The side panels 138 of the air bag 132, at the areas that extend over the vent openings 170, include holes, illustrated schematically in FIGS. 6-8 with dashed lines, through which inflation fluid may flow.

The air bag module 130 also includes locking members 202. Each tether 188 has an associated locking member 202. FIG. 6 illustrates two locking members 202. FIGS. 7 and 8 illustrated enlarged views of one of the two locking members 202 of FIG. 6.

As best shown in FIGS. 7 and 8, the locking member 202 includes a guide portion 206 and a lock portion 208. The guide portion 206 of the locking member 202 is formed in one piece with the bag retainer 198. The guide portion 206 of the locking member 202 includes a support arm 210 that extends away from the bag retainer 198 in a direction parallel to axis A. A guide arm 212 extends away from of an end of the support arm 210 opposite the bag retainer 198 and in a direction perpendicular to the support arm. The guide portion 206 of the locking member 202 also includes an attachment portion 214. The attachment portion 214 is located on an end of the support arm 210 adjacent the bag retainer 198 and has a semi-circular configuration.

The lock portion 208 of the locking member 202 is an elongated member having opposite first and second ends 218 and 220, respectively. The first end 218 of the lock portion 208 is pivotally attached to the attachment portion 214 of the guide portion 206. The second end 220 of the lock portion 208 is angled relative to the remainder of the lock portion. The lock portion 208 has a length measured axially along axis A that is equal to the distance between the attachment portion 214 and the guide arm 212 of the guide portion 206. When the lock portion 208 is pivotally attached to the guide portion 206, the angled second end 220 of the lock portion 208 engages the guide arm 212 of the guide portion 206. A spring (not shown) or other biasing member acts between the guide portion 206 and the lock portion 208 of the locking member 202 to bias the second end 220 of the lock portion into engagement with the guide arm 212 of the guide portion.

As shown in FIGS. 6-8, each tether 188 passes through its associated locking member 202 when extending between the air bag 132 and the vent member 176. The tether 188 passes between the angled second end 220 of the lock portion 208 and the guide arm 212 of the guide portion 206.

The air bag module 130 also includes a cover 226 (FIG. 6). The cover 226 includes a front panel 228 and side panels. FIG. 6 illustrates two of the side panels at 230. The front panel 228 of the cover 226 includes a tear seam 232 that ruptures to enable deployment of the air bag 132 from the air bag module 130. The side panels 230 of the cover 226 extend perpendicularly from the front panel 228 and overlie the side walls 162 of the reaction can 158. The side panels 230 of the cover 226 are fixed to the side walls 162 of the reaction can 158 in a known manner, such as with fasteners (not shown).

The reaction can 158 and the front panel 228 of the cover 226 define a chamber 238 in the air bag module 130. When the air bag module 130 is in a non-actuated condition, as shown in FIG. 6, the deflated air bag 132 is folded and stored in the chamber 238. When stored in the chamber 238, the outer panel 136 of the air bag 132 is adjacent the front panel 228 of the cover 226. Also when the air bag module 130 is in the non-actuated condition, there is a significant amount of slack in the tethers 188. The slack is present because the length of each tether 188 is greater than the distance between the portion of the outer panel 136 of the air bag 132 to which the first end portion 190 of the tether is attached and the vent member 176 to which the second end portion 192 of the tether is attached.

When the air bag module 130 is in the non-actuated condition, as is shown in FIG. 6, the vent member 176 is in a closed position closing the vent opening 170. When the vent member 176 is in the closed position, debris and other foreign matter are prevented from entering the chamber 238 of the air bag module 130 through the vent opening 170. Preferably, the vent member 176 of the air bag module 130 is in the closed position prior to actuation of the inflator 146.

When the inflator 146 of the air bag module 130 is actuated, inflation fluid exits the inflator 146 and begins to fill the air bag 132. In response to receiving inflation fluid from the inflator 146, the air bag 132 expands within the chamber 238 and begins to press against the front panel 228 of the cover 226. As additional inflation fluid enters the air bag 132, the pressure within the air bag 132 increases. The pressure within the air bag 132 acts on each vent member 176 through the holes in the side panels 138 of the air bag 132. Since an exterior surface of each vent member 176 is subject to atmospheric pressure, a pressure differential arises across the closing portion 180 of the vent member 176. When the pressure differential reaches a predetermined level, the vent member 176 bends at its hinge 182 and the closing portion 180 moves away from the vent opening 170. Thus, in response to the pressure differential, the vent member 176 moves from the closed position, shown in FIG. 6, to the open position, shown in FIG. 7. When the vent member is in the open position, inflation fluid may flow out of the chamber 238 through the vent opening 170.

Since the output of inflation fluid from the inflator 146 is greater than the amount of inflation fluid that may exit the air bag 132 through the vent openings 170, the inflation fluid pressure within the air bag 132 continues to increase after the vent members 176 are moved to the open position. The increasing pressure in the air bag 132 results in an increasing pressure that is applied to the front panel 228 of the cover 226. The increasing pressure that is applied to the front panel 228 of the cover 226 eventually ruptures the tear seam 232 of the front panel of the cover and enables the air bag 132 to expand outward of the chamber 238 of the air bag module 130.

As the air bag 132 inflates, the outer panel 136 of the air bag 132 moves away from the end wall 160 of the reaction can 158 and away from the vent members 176. If the outer panel 136 moves away from the reaction can 158 by less than a predetermined distance, slack remains in the tethers 188. When slack remains in the tethers 188 as a result of the outer panel 136 moving away from the reaction can 158 by less than the predetermined distance, the tethers 188 do not pull on the vent members 176 and the vent members remain in the open position, spaced apart from the vent openings 170. This enables flow of inflation fluid away from the air bag 132 through the vent openings, as shown with reference to one vent opening 170 in FIG. 7. Such venting of the air bag 132 can reduce the force and pressure with which the air bag inflates.

When the outer panel 136 of the air bag 132 moves away from the reaction can 158 by more than the predetermined amount, the slack is completely removed from the tethers 188 and the tethers are tensioned. The tensioned tethers 188 pull the vent members 176 from the open position, shown in FIG. 7, back toward the closed position in which the vent members block the flow of inflation fluid through the vent openings 170. When the vent members 176 are moved back into the closed position during inflation of the air bag 132, as is shown in FIG. 8, the air bag 132 inflates with full force and pressure.

Each of the locking members 202 prevents movement of a tether 188 through the locking member in a direction toward the vent member 176. When a force acts to pull the tether 188 through the locking member 202 in a direction toward the vent member 176, the second end 220 of the lock portion 208 clamps against the guide arm 212 of the guide portion 206 to lock the tether between the lock portion and guide portion. When a force acts to pull the tether 188 through the locking member 202 in a direction toward the outer panel 136 of the air bag 132, the force causes the second end 220 of the lock portion 208 to pivot away from the guide arm 212 of the guide portion 206. As a result, the tether 188 may move through the locking member 202 toward the outer panel 136 of the air bag 132. Thus, the locking member 202 prevents tether 188 travel in a first direction toward the vent member 176 and allows tether travel in a second direction toward the outer panel 136 of the air bag 132.

During assembly of the air bag module 130, a predetermined amount of the tether 188 is located between each vent member 176 and each locking member 202. The remainder of each tether 188 is located between the locking member 202 and the outer panel 136 of the air bag 132. The predetermined amount is an amount sufficient for slack to be present between the vent member 176 and the locking member 202 and is chosen to control the location of the open position of the vent member.

To aid in providing the predetermined amount of the tether 188 between each vent member 176 and each locking member 202 during assembly, the tethers 188 may include a tether positioning aid (not shown). The tether positioning aid may be a knot that is formed in the tether 188. Alternatively, the tether positioning aid may be markings on the tether 188, or a member that is sewn or otherwise fixed to the tether.

When the inflator 146 of the air bag module 130 is actuated, the pressure within the air bag 132 acts on the vent member 176 and moves the vent member from the closed position, shown in FIG. 6, to the open position, shown in FIG. 7. When the vent member 176 is in the open position, the predetermined amount of the tether 188 located between the vent member 176 and the locking member 202 is pulled taut, as shown in FIG. 7. Since the locking member 202 prevents movement of the tether 188 toward the vent member 176, the tautness of predetermined amount of the tether 188 prevents further movement of the vent member 176. Thus, the locking member 202 and the predetermined amount of the tether 188 control the open position of the vent member 176 and control the amount of fluid that may flow out of the chamber 238 through the vent opening 170 when the vent member is in the open position.

When the outer panel 136 of the air bag 132 moves away from the reaction can 158 by the predetermined amount, the slack is completely removed from the tether 188 and the tether is tensioned. Further movement of the outer panel 136 of the air bag 132 away from the reaction can 158 acts to pull the tether 188 through the locking member 202 in the direction of the outer panel, i.e., rightward, as viewed in FIGS. 6-8. The movement of the tether 188 pulls the vent member 176 from the open position, shown in FIG. 7, back toward the closed position in which the vent member blocks the flow of inflation fluid through the vent opening 170.

FIG. 8 illustrated the vent member 176 back in the closed position. When the air bag module 130 of the present invention is actuated for helping to protect an occupant of a vehicle, the vent member 176 may be at any position between the open position and the closed position when occupant interaction with the air bag 132 prevents further movement of the outer panel 136 of the air bag away from the reaction can 158. The interaction between the occupant and the air bag 132 may result in an increase in pressure within the air bag that tends to force the vent members 176 away from the reaction can 158 and back toward the open position. By preventing the tethers 188 from moving toward the vent members 176, the locking members 202 prevent the movement of the vent members 176 back toward the open position. Thus, the locking members 202 block movement of the vent members 176 that would increase a flow of inflation fluid through the vent openings 170 and reduce pressure in the air bag 132. As a result, the locking members 202 maintain pressure within the air bag 132.

The locking members 202 prevent the movement of the vent members 176 back toward the open position regardless of the position of the vent members along the path between the open and closed positions at the occurrence of the interaction between the occupant and the air bag 132. Thus, the locking members 202 may be referred to as being "infinitely adjustable" as the locking members prevent movement of the vent members 176 toward the open position at all positions of the vent member between the open and closed positions.

FIGS. 9A and 9B illustrate a second alternative locking member 250. The locking member 250 of FIGS. 9A and 9B may be used with either the air bag module 10 of FIGS. 1-3 or the air bag module 130 of FIGS. 6-8.

The locking member 250 of FIGS. 9A and 9B includes a guide portion 252 and a lock portion 254. The guide portion 252 is formed on an interior surface 258 of a support member 260. The support member 260 may be a reaction plate as shown in FIGS. 1-3 or a reaction can as shown in FIGS. 6-8.

As shown in FIG. 9A, the guide portion 252 includes two protrusions 266, each having an aperture 268. The apertures 268 of the two protrusions 266 are coaxial with one another and are adapted for receiving a pivot pin 270. The guide portion 252 also includes a U-shaped bracket 272 that extends outwardly of the interior surface 258. The U-shaped bracket 272 includes two arm portions 274 and an end portion 276. The end portion 276 of the U-shaped bracket 272 extends generally parallel to the pivot pin 270 when the pivot pin is received in the apertures 268 of the protrusions 266. The arm portions 274 are generally aligned with the protrusions 266 so that the end portion 276 of the U-shaped bracket 272 is spaced above, as viewed in FIG. 9A, the pivot pin 270 when the pivot pin is received in the apertures 268 of the protrusions 266.

The lock portion 254 of the locking member 250 includes a clamping plate 282 having an outer surface 284 and an inner surface 286 (FIG. 9B). The clamping plate 282 also includes an end 288 having a plurality of teeth 290. Two protrusions 292 extend outwardly of the inner surface 286 of the clamping plate 282. FIG. 9A illustrates one of the two protrusions 292 and FIG. 9B illustrates the other of the two protrusions. The two protrusions 292 of the clamping plate 282 are spaced from one another so as to fit between the two protrusions 266 of the guide portion 252. Each of the protrusions 292 includes an aperture 294 (FIG. 9A) that is sized for receiving the pivot pin 270.

The locking member 250 also includes a spiral spring 300. As shown in FIG. 9A, the spiral spring 300 includes a helical central portion 302 and opposite first and second end portions 304 and 306, respectively. The helical central portion 302 receives the pivot pin 270 and is located between the two protrusions 292 of the lock portion 254. The first end portion 304 of the spiral spring 300 engages the inner surface 286 of the clamping plate 282 and a second end portion 306 of the spiral spring engages the interior surface 258 of the support member 260. The spiral spring 300 biases the teeth 290 of the clamping plate 282 of the lock portion 254 against the end portion 276 of the U-shaped bracket 272 of the guide portion 252.

In FIG. 9B, dashed lines illustrate a tether 310 extending through the locking member 250. The locking member 250 of FIGS. 9A and 9B enables the tether 310 to be moved in a direction upward, as viewed in FIG. 9B, through the locking member and prevents movement of the tether in a direction downward, as viewed in FIG. 9B, through the locking member. When a force acts to pull the tether 310 through the locking member 250 in a direction downward, as viewed in FIG. 9B, the teeth 290 of the clamping plate 282 grip the tether 310 and prevent movement of the tether between the lock portion 254 and guide portion 252. When a force acts to pull the tether 310 in a direction upward, as viewed in FIG. 9B, through the locking member 250, the force acts against the bias of the spiral spring 300, moves the clamping plate 282 away from the end portion 276 of the U-shaped bracket 272, and enables the tether 310 to move upwardly through the locking member.

The locking member 250 of FIGS. 9A and 9B prevents the downward movement of the tether 310 regardless of the position of the tether. Thus, the locking member 250 of FIGS. 9A and 9B also may be referred to as being "infinitely adjustable" as the locking member is capable of preventing movement of a vent member toward the open position at all positions of the vent member between the open and closed positions after the tether 310 has been pulled taut.

The locking member 250 of FIGS. 9A and 9B may also be used to control the open position of the vent member. Since the locking member 250 prevents movement of the tether 310 in a direction downward, as viewed in FIG. 9B, the operation of the locking member 250 and an amount of slack present in a portion of the tether 310 between the locking member and the vent member control the open position of the vent member and prevent opening of the vent member beyond the specified open position. For example, if it is desired for the open position of the vent member to be at a fifty degree angle relative to the support member 260, the portion of the tether 310 between the vent member and the locking member 250 may have a length such that the portion of the tether becomes taut when the vent member reaches the fifty degree angle. Since the locking member 250 prevents the length of the portion of the tether 310 between the vent member and the locking member 250 from increasing, the locking member 250 and the tether 310 prevent the vent member from opening beyond the specified open position, e.g., fifty degrees.

Figure 10B:
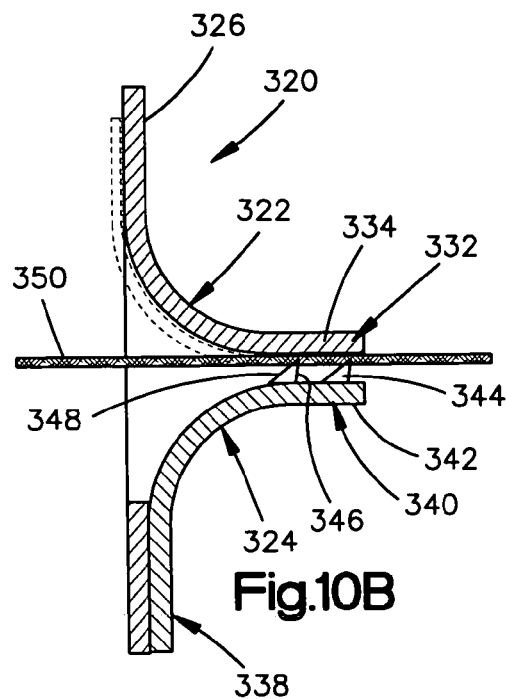

FIGS. 10A and 10B illustrate a third alternative locking member 320. The locking member 320 of FIGS. 10A and 10B may be used with either the air bag module 10 of FIGS. 1-3 or the air bag module 130 of FIGS. 6-8.

The locking member 320 of FIGS. 10A and 10B includes a guide portion 322 and a lock portion 324. The guide portion 322 is a generally planar, rectangular plate 326 into which a U-shaped opening 328 (FIG. 10A) is stamped. The ends of the U-shaped opening 328 are illustrated in FIG. 10A at 330. Part of the guide portion 322 located between the ends 330 of the U-shaped opening 328 is bent out of the plane of the plate 326, as shown in FIG. 10B, to form a guide arm 332. An end 334 of the guide arm 332 extends perpendicular to the plane of the plate 326.

The lock portion 324 of the locking member 320 includes a planar base 338 and a resilient locking arm 340 that is bent out of the plane of the base. An end 342 of the locking arm 340 opposite the base 338 extends perpendicular to the base. Locking teeth 344 extend outwardly of the locking arm 340 in a direction parallel to the base 338. As shown in FIG. 10B, the locking teeth 344 include a flat right side surface 346 and a tapered left side surface 348. FIG. 10A illustrates the flat surfaces 346 of the locking teeth 344 as being triangular in shape.

To assemble the locking member 320 of FIGS. 10A and 10B, the base 338 of the lock portion 324 is placed on top of the plate 326 of the guide portion 322 so that the teeth 344 of the locking arm 340 terminate adjacent the guide arm 332, as shown in FIG. 10B. The locking member 320 is positioned in the air bag module so that the ends 334 and 342 of the guide arm 332 and the locking arm 340, respectively, are nearest the outer panel of the air bag.

FIGS. 10A and 10B illustrate a tether 350 extending through the locking member 320. The tether 350 may extend straight through the locking member 320, as shown by solid lines in FIG. 10B, or may turn while passing over the guide arm 332 of the locking member, as shown by dashed lines in FIG. 10B.

The locking member 320 of FIGS. 10A and 10B enables the tether 350 to be moved rightward, as viewed in FIG. 10B, through the locking member and prevents movement of the tether leftward, as viewed in FIG. 10B, through the locking member. When a force acts to pull the tether 350 through the locking member 320 in a direction leftward, as viewed in FIG. 10B, the teeth 344 of the locking arm 340 grip the tether 350 and the tether pulls the locking arm and the guide arm 332 together to lock the tether between the lock portion 324 and guide portion 322. When a force acts to pull the tether 350 rightward, as viewed in FIG. 10B, through the locking member, the force causes the locking arm 340 of the lock portion 324 to bend away from the guide arm 332 of the guide portion 322 and enables the tether 350 to move over the tapered surfaces 348 of the teeth 344 and through the locking member 320.

The locking member 320 prevents the leftward movement of the tether 350 regardless of the position of the tether. Thus, the locking member 320 of FIGS. 10A and 10B also may be referred to as being "infinitely adjustable" as the locking member prevents movement of a vent member toward the open position at all positions of the vent member between the open and closed positions.

The locking member 320 of FIGS. 10A and 10B may also be used to control the open position of the vent member. Since the locking member 320 prevents movement of the tether 350 toward the vent member, the operation of the locking member 320 and an amount of slack present in a portion of the tether 350 between the locking member and the vent member control the open position of the vent member and prevent opening of the vent member beyond the specified open position.

Figure 11:
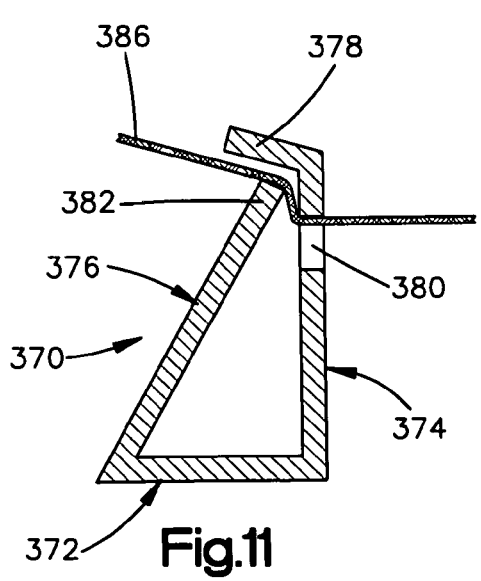
FIG. 11 illustrates a fourth alternative locking member.

FIG. 11 illustrates a fourth alternative locking member 370. The locking member 370 of FIG. 11 may be used with either the air bag module 10 of FIGS. 1-3 or the air bag module 130 of FIGS. 6-8.

The locking member 370 of FIG. 11 is a one-piece structure that includes a base portion 372, a guide portion 374, and a lock portion 376. The locking member 370 is preferably formed from steel and is resilient.

The base portion 372 of the locking member 370 is generally planar. The guide portion 374 extends upwardly, as viewed in FIG. 11, from a first end of the base portion 372 at an angle of approximately ninety degrees relative to the base portion. An end 378 of the guide portion 374 opposite the base portion 372 is angled at an angle of approximately 120 degrees relative to the guide portion and extends over the base portion of the locking member 370. An opening 380 extends through the guide portion 374 at a location spaced slightly below, as viewed in FIG. 11, the angled end 378 of the guide portion.

The lock portion 376 of the locking member 370 is planar and extends upwardly from a second end of the base portion 372 at an angle of approximately sixty degrees relative to the base portion. An end 382 of the lock portion 376 terminates adjacent the angled end 378 of the guide portion 374.

A tether 386 extends through the opening 380 of the guide portion 374 of the locking member 370 and passes between the end 382 of the lock portion 376 and the angled end 378 of the guide portion. The locking member 370 of FIG. 11 enables the tether 386 to be moved leftward, as viewed in FIG. 11, through the locking member and prevents movement of the tether rightward, as viewed in FIG. 11, through the locking member. When a force acts to pull the tether 386 through the locking member 370 in a direction rightward, as viewed in FIG. 11, through the locking member, the tether 386 pulls the lock portion 376 against the guide portion 374 to lock the tether between the lock portion and guide portion. When a force acts to pull the tether 386 leftward, as viewed in FIG. 11, through the locking member 370, the force causes the lock portion 376 to bend leftward, as viewed in FIG. 11, and away from the guide portion 374 to enable the tether to move through the locking member 370.

The locking member 370 prevents the rightward movement of the tether 386 regardless of the position of the tether. Thus, the locking member 370 of FIG. 11 also may be referred to as being "infinitely adjustable" as the locking member prevents movement of a vent member toward the open position at all positions of the vent member between the open and closed positions.

The locking member 370 of FIG. 11 may also be used to control the open position of the vent member. Since the locking member 370 prevents movement of the tether 386 toward the vent member, the operation of the locking member 370 and an amount of slack present in a portion of the tether 386 between the locking member and the vent member control the open position of the vent member and prevent opening of the vent member beyond the specified open position.

Figure 12:
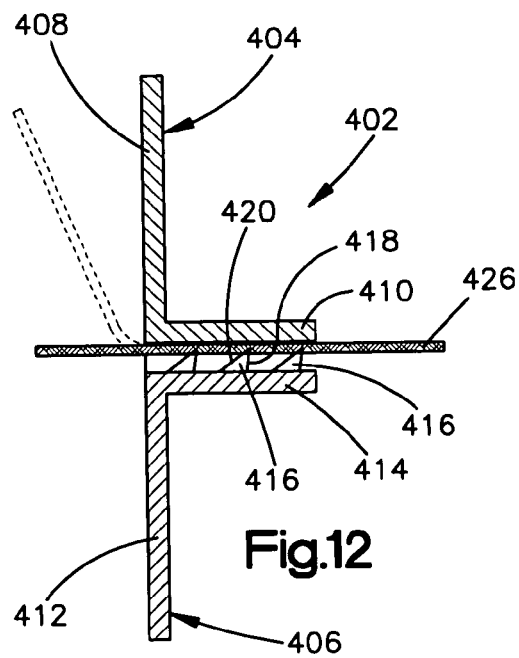
FIG. 12 illustrates a fifth alternative locking member.

FIG. 12 illustrates a fifth alternative locking member 402. The locking member 402 of FIG. 12 may be used with either the air bag module 10 of FIGS. 1-3 or the air bag module 130 of FIGS. 6-8. The locking member 402 of FIG. 12 is similar to the locking member 320 described with reference to FIGS. 10A and 10B.

The locking member 402 of FIG. 12 includes a guide portion 404 and a lock portion 406. The guide portion 404 includes a generally planar base 408 and a generally planar guide arm 410 that extends in a direction perpendicular to an end of the base.

The lock portion 406 of the locking member 402 is formed from a resilient material and includes a generally planar base 412 and a generally planar locking arm 414 that extends in a direction perpendicular to an end of the base. Locking teeth 416 extend outwardly of the locking arm 414 in a direction parallel to the base 412. As shown in FIG. 12, the locking teeth 416 include a flat right side surface 418 and a tapered left side surface 420.

To assemble the locking member 402 of FIG. 12, the base 412 of the lock portion 406 is placed adjacent the base 408 of the guide portion 404 so that the locking arm 414 and the guide arm 410 are adjacent one another. The locking member 402 of FIG. 12 is positioned in the air bag module so that the locking arm 414 and the guide arm 410 are nearer the outer panel of the air bag as compared to the base portions 408 and 412.

FIG. 12 illustrates a tether 426 extending through the locking member 402. The tether 426 may extend straight through the locking member 402, as shown by solid lines in FIG. 12, or may turn while passing over the guide portion 404 of the locking member 402, as shown by dashed lines in FIG. 12. The locking member 402 of FIG. 12 enables the tether 426 to be moved rightward, as viewed in FIG. 12, through the locking member and prevents movement of the tether leftward, as viewed in FIG. 12, through the locking member. When a force acts to pull the tether 426 through the locking member 402 in a direction leftward, as viewed in FIG. 12, the teeth 416 of the locking arm 414 grip the tether 426 and the tether pulls the locking arm and the guide arm 410 together to lock the tether between the lock portion 406 and guide portion 404. When a force acts to pull the tether 426 in a direction rightward, as viewed in FIG. 12, the locking arm 414 flexes away from the guide arm 410 and tether 426 slides over the tapered surfaces 420 of the teeth 416 and through the locking member 402.

The locking member 402 prevents the leftward movement of the tether 426 regardless of the position of the tether. Thus, the locking member 402 of FIG. 12 also may be referred to as being "infinitely adjustable" as the locking member prevents movement of a vent member toward the open position at all positions of the vent member between the open and closed positions.

The locking member 402 of FIG. 12 may also be used to control the open position of the vent member. Since the locking member 402 prevents movement of the tether 426 toward the vent member, the operation of the locking member 402 and an amount of slack present in a portion of the tether 426 between the locking member and the vent member control the open position of the vent member and prevent opening of the vent member beyond the specified open position.

FIG. 13 illustrates a sixth alternative locking member 440. The locking member 440 of FIG. 13 may be used with either the air bag module 10 of FIGS. 1-3 or the air bag module 130 of FIGS. 6-8. The locking member 440 of FIG. 13 includes a guide portion 442 and a lock portion 444. The guide portion 442 includes a generally planar base 446 and a generally planar guide arm 448 that extends upwardly, as viewed in FIG. 13, from an end of the base.

The lock portion 444 of the locking member 440 includes a piston 450, a cylinder 452, and a biasing member, such as a spring 454. The cylinder 452 includes a channel 456 that is open at one end and closed at the other end. The piston 450 is cylindrical and, as viewed in FIG. 13, includes a right side end wall 458 and a left side end wall 460. A plurality of locking teeth 462 extends outwardly of the right side end wall 458 of the piston 450. As shown in FIG. 13, the locking teeth 462 include a flat upper surface 464 and a tapered lower surface 466. An annular groove 468 extends into the left side end wall 460 of the piston 450. The annular groove 468 forms a circular plunger portion 470 of the piston 450 that is sized to be received in the open end of the channel 456 of the cylinder 452.

To assemble the locking member 440 of FIG. 13, the spring 454 is inserted into the channel 456 of the cylinder 452. The plunger portion 470 of the piston 450 is inserted into the cylinder 452 so that the spring 454 acts on the piston to force the piston out of the channel 456. The guide portion 442 of the locking member 440 is fixed relative to the right side end wall 458 of the piston 450 so that the spring 454 biases the teeth 462 of the piston against the guide arm 448 of the guide portion of the locking member.

FIG. 13 illustrates a tether 476 extending upwardly through the locking member 440. The tether 476 may extend straight through the locking member 440, as shown by solid lines in FIG. 13, or may turn while passing over the guide portion 442 of the locking member 440, as shown by dashed lines in FIG. 13. The locking member 440 of FIG. 13 enables the tether 476 to be moved upwardly, as viewed in FIG. 13, through the locking member and prevents movement of the tether downwardly, as viewed in FIG. 13, through the locking member. When a force acts to pull the tether 476 through the locking member in a direction downward, as viewed in FIG. 13, the teeth 462 of the locking portion 444 grip the tether 476 to prevent the tether from moving downwardly between the piston 450 and the guide arm 448. When a force acts to pull the tether 476 in a direction upward, as viewed in FIG. 13, the tether 476 slides over the tapered lower surfaces 466 of the teeth 462 and acts to move the piston 450 leftward, as viewed in FIG. 13, against the bias of the spring 454 and away from the guide arm 448. As a result, the tether 476 may be moved upwardly through the locking member 440.

The locking member 440 prevents the downward movement of the tether 476 regardless of the position of the tether. Thus, the locking member 440 of FIG. 13 also may be referred to as being "infinitely adjustable" as the locking member prevents movement of a vent member toward the open position at all positions of the vent member between the open and closed positions.

The locking member 440 of FIG. 13 may also be used to control the open position of the vent member. Since the locking member 440 prevents movement of the tether 476 toward the vent member, the operation of the locking member 440 and an amount of slack present in a portion of the tether 476 between the locking member and the vent member control the open position of the vent member and prevent opening of the vent member beyond the specified open position.

FIG. 14 illustrates a seventh alternative locking member 440a. The locking member 440a of FIG. 14 may be used with either the air bag module 10 of FIGS. 1-3 or the air bag module 130 of FIGS. 6-8. The locking member 440a of FIG. 14 is similar to the locking member 440 of FIG. 13. Therefore, the same reference number with the addition of the suffix "a" is used to represent the same or similar structures of the locking member of 440a FIG. 14 as was used with the locking member 440 of FIG. 13.

The locking member 440a of FIG. 14 is the same as the locking member 440 of FIG. 13 with the exception that the cylinder 452a and spring 454a of FIG. 13 have been replaced in FIG. 14 by a conduit 480 that extends from the inflator 482. The conduit 480 includes a flanged end 484 for fixing the conduit to the inflator 482 so that the channel 486 of the conduit is in fluid communication with an exhaust port 488 of the inflator. Inflation gases entering the conduit 482, force the piston 450a rightward, as viewed in FIG. 14.

FIG. 14 illustrates a tether 476a extending upwardly through the locking member 440a. The tether 476a may extend straight through the locking member 440a, as shown by solid lines in FIG. 14, or may turn while passing over the guide arm 448a of the locking member 440a, as shown by dashed lines in FIG. 14. The locking member 440a of FIG. 14 enables the tether 476a to be moved upwardly, as viewed in FIG. 14, through the locking member and prevents movement of the tether downwardly, as viewed in FIG. 14, through the locking member.

When a force acts to pull the tether 476a through the locking member 440a in a direction downward, as viewed in FIG. 14, the teeth 462a of the locking portion 444a grip the tether 476a to prevent the tether from moving downwardly between the piston 450a and the guide arm 448a. The force of the inflation fluid acting on the piston 450a resists the leftward movement, as viewed in FIG. 14, of the piston 450a and the tether 476a is prevented from moving downwardly through the locking member 440a. When a force acts to pull the tether 476a in a direction upward, as viewed in FIG. 14, the tether 476a slides over the tapered lower surfaces 466a of the teeth 462a. As a result, the tether 476a may be moved upwardly through the locking member 440a.

The locking member 440a prevents the downward movement of the tether 476a regardless of the position of the tether. Thus, the locking member 440a of FIG. 14 also may be referred to as being "infinitely adjustable" as the locking member prevents movement of a vent member toward the open position at all positions of the vent member between the open and closed positions.

The locking member 440a of FIG. 14 may also be used to control the open position of the vent member. Since the locking member 440a prevents movement of the tether 476a toward the vent member 440a, the operation of the locking member and an amount of slack present in a portion of the tether 476a between the locking member and the vent member control the open position of the vent member and prevent opening of the vent member beyond the specified open position.

FIG. 15 illustrates an eighth alternative locking member 502. The locking member 502 of FIG. 15 may be used with either the air bag module 10 of FIGS. 1-3 or the air bag module 130 of FIGS. 6-8.

The locking member 502 of FIG. 15 includes a guide portion 504 and a lock portion 506. The guide portion 504 includes a generally planar base 508 and a generally planar guide arm 510 that extends upwardly, as viewed in FIG. 15, from an end of the base.

The lock portion 506 of the locking member 502 includes a roller 512 and a support arm 514. The support arm 514 is fixed to the guide arm 510 of the guide portion 504 of the locking member 502 and extends outwardly from the guide arm on a side opposite the base 508. The support arm 514 extends at an angle of approximately 75 degrees relative to the guide arm 510.

The roller 512 is generally cylindrical and includes a toothed outer surface 516. An axle 518 extends through the roller 512 in a location spaced from the center of the roller, indicated with the +(plus sign) on the roller. The support arm 514 supports the axle 518.

FIG. 15 illustrates a tether 524 extending upwardly through the locking member 502. The tether 524 may extend straight through the locking member 502, as shown by solid lines in FIG. 15, or may turn while passing over the guide portion 504 of the locking member 502, as shown by dashed lines in FIG. 15. When the roller 512 is positioned as shown in FIG. 15, the locking member 502 enables the tether 524 to be moved upwardly, as viewed in FIG. 15, through the locking member and prevents movement of the tether downwardly, as viewed in FIG. 15, through the locking member.

When a force acts to pull the tether 524 through the locking member in a direction downward, as viewed in FIG. 15, the toothed outer surface 516 of the roller 512 grips the tether and the tether pulls the roller in a clockwise direction about the axle 518. As a result, the tether 524 is clamped between the roller 512 and the guide arm 510 of the guide portion 504 and is prevented from moving downwardly. When a force acts to pull the tether 524 upwardly, as viewed in FIG. 15, the tether 524 pulls the roller 512 in a counterclockwise direction. When the roller 512 rotates in the counterclockwise direction, a space between the roller and the guide arm 510 increases and enables the tether 524 to move upwardly through the locking member 502.

FIG. 16 illustrates a ninth alternative locking member 530. The locking member 530 of FIG. 16 may be used with either the air bag module 10 of FIGS. 1-3 or the air bag module 130 of FIGS. 6-8.

The locking member 530 of FIG. 16 includes a guide portion 532 and a lock portion 534. The guide portion 532 includes a generally planar base 536 and a generally planar guide arm 538 that extends upwardly, as viewed in FIG. 16, from an end of the base.

The lock portion 534 of the locking member 530 includes a support arm 540 and a cam member 542. The cam member 542 includes a toothed surface 544 that is located adjacent the guide arm 538 of the guide portion 532. A pivot 546 rotatably connects the cam member 542 and the support arm 540. A spiral spring (not shown) biases the cam member 542 for rotation in a clockwise direction, as viewed in FIG. 16, about the pivot 546.

FIG. 16 illustrates a tether 550 extending upwardly through the locking member 530. The tether 550 may extend straight through the locking member 530, as shown by solid lines in FIG. 16, or may turn while passing over the guide portion 532 of the locking member 530, as shown by dashed lines in FIG. 16. The locking member 530 enables the tether 550 to be moved upwardly, as viewed in FIG. 16, through the locking member and prevents movement of the tether downwardly, as viewed in FIG. 16, through the locking member.

When a force acts to pull the tether 550 through the locking member in a direction downward, as viewed in FIG. 16, the toothed surface 544 of the cam member 542 grips the tether 550 and the tether pulls the cam member in a clockwise direction about the pivot 546. As a result, the tether 550 is clamped between the cam member 542 and the guide arm 538 of the guide portion 532 and is prevented from moving downwardly. When a force acts to pull the tether 550 upwardly, as viewed in FIG. 16, the tether 550 pulls the cam member 542 in a counterclockwise direction and the cam member rotates away from the guide arm 538 of the guide portion 532 to enable the tether to move upwardly through the locking member 530.

The locking member 530 prevents the downward movement of the tether 550 regardless of the position of the tether. Thus, the locking member 530 of FIG. 16 also may be referred to as being "infinitely adjustable" as the locking member prevents movement of a vent member toward the open position at all positions of the vent member between the open and closed positions.

The locking member 530 of FIG. 16 may also be used to control the open position of the vent member. Since the locking member 530 prevents movement of the tether 550 toward the vent member, the operation of the locking member 530 and an amount of slack present in a portion of the tether 550 between the locking member and the vent member control the open position of the vent member and prevent opening of the vent member beyond the specified open position.

FIGS. 17A and 17B illustrate a tenth alternative locking member 560. The locking member 560 of FIGS. 17A and 17B may be used with either the air bag module 10 of FIGS. 1-3 or the air bag module 130 of FIGS. 6-8.

The locking member 560 of FIGS. 17A and 17B includes a guide portion 562 and a lock portion 564. The guide portion 562 is a parallelepiped having a toothed upper surface 566. The lock portion 564 is a parallelepiped having a toothed lower surface 568.

A toggle linkage 570, shown by dashed lines in FIGS. 17A and 17B, connects the guide portion 562 and the lock portion 564. The toggle linkage 570 includes two toggle members. FIGS. 17A and 17B illustrate only one of the two toggle members at 572. The toggle members 572 are located on opposite sides of the locking member 560. Each toggle member 572 is elongated and includes lower and upper ends 576 and 578, respectively. The lower end 576 of each toggle member 572 is pivotally attached to the guide portion 562 and the upper end 578 of each toggle member is pivotally attached to the lock portion 564.

Each toggle member 572 is pivotal relative to the guide portion 562 between first and second conditions. In the first condition, illustrated in FIG. 17A, the toggle member 572 extends perpendicular to a plane of the toothed upper surface 566 of the guide portion 562. In the second condition, illustrated in FIG. 17B, the toggle member 572 extends at an angle of approximately sixty degrees relative to the plane of the toothed upper surface 566 of the guide portion 562.

Each toggle member 572 also is pivotal relative to the lock portion 564 between first and second conditions. In the first condition, illustrated in FIG. 17A, the toggle member 572 extends perpendicular to a plane of the toothed lower surface 568 of the lock portion 564. In the second condition, illustrated in FIG. 17B, the toggle member 572 extends at an angle of approximately sixty degrees relative to the plane of the toothed lower surface 568 of the lock portion 564.

The toggle linkage 570 enables the lock portion 564 of the locking member 560 to move rightward and downward relative to the guide portion 562 from the position shown in FIG. 17A to the position shown in FIG. 17B. The locking member 560 of FIGS. 17A and 17B is positioned in the air bag module so that the lock portion 564 moves toward a vent member when the lock portion moves downwardly relative to the guide portion 562. Thus, the locking member 560 of FIGS. 17A and 17B is positioned in the air bag module so that the vent member is to the right of the locking member, as viewed in FIGS. 17A and 17B.

The tether 584 extends through the locking member 560 between the toothed upper surface 566 of the guide portion 562 and the toothed lower surface 568 of the lock portion 564. When extending through the locking member 560, the tether 584 is located between the two toggle members 572.

The locking member 560 of FIGS. 17A and 17B enables the tether 584 to be moved in a direction leftward, as viewed in FIGS. 17A and 17B, through the locking member and prevents movement of the tether in a direction rightward, as viewed in FIGS. 17A and 17B, through the locking member. When a force acts to pull the tether 584 through the locking member 560 in a direction leftward, as viewed in FIGS. 17A and 17B, the lock portion 564 of the locking member 560 remains spaced away from the guide portion 562 and the tether may pass through the space between the lock portion and the guide portion.

When a force acts to pull the tether 584 in a direction rightward, as viewed in FIGS. 17A and 17B, the toothed lower surface 568 of the lock portion 564 grips the tether and the rightward movement of the tether causes the lock portion to move rightward and downward relative to the guide portion 562 from the position illustrated in FIG. 17A to the position illustrated in FIG. 17B. When the locking member 564 is in the position illustrated in FIG. 17B, the tether 584 is clamped between the toothed lower surface 568 of the lock portion 564 and the toothed upper surface 566 of the guide portion 562 and is prevented from moving rightward through the locking member 560.

The locking member 560 of FIGS. 17A and 17B prevents movement of the tether 584 in the rightward direction regardless of the position of the tether. Thus, the locking member 560 of FIGS. 17A and 17B also may be referred to as being "infinitely adjustable" as the locking member prevents movement of a vent member toward the open position at all positions of the vent member between the open and closed positions.

The locking member 560 of FIGS. 17A and 17B may also be used to control the open position of the vent member. Since the locking member 560 prevents movement of the tether 584 toward the vent member, the operation of the locking member 560 and an amount of slack present in a portion of the tether 584 between the locking member and the vent member control the open position of the vent member and prevent opening of the vent member beyond the specified open position.

FIGS. 18A-D illustrate an eleventh alternative locking member 602. The locking member 602 of FIGS. 18A-D may be used with either the air bag module 10 of FIGS. 1-3 or the air bag module 130 of FIGS. 6-8.

Unlike the locking members previously discussed, the locking member 602 of FIGS. 18A-D acts directly on the vent member to prevent the closing portion of the vent member from moving toward the open position after the closing portion of the vent member has been moved from the open position toward the closed position.

The locking member 602 of FIGS. 18A-D includes three protrusions 604 that are formed on an interior surface 606 of the support member 608 near a vent opening 610. The three protrusions 604 support a first end 614 of an elongated and resilient metal wire 616. FIG. 18A illustrates the first end 614 of the wire 616 including a curved portion that partially wraps around the protrusion 604 farthest from the vent opening 610. A second end 618 of the wire 616 extends over the vent opening 610.

The locking member 602 also includes a hook-shaped protrusion 620 that extends inwardly from an interior surface 622 of the vent member 624. As viewed in FIG. 18B, the left side 626 of the hook-shaped protrusion 620 includes a latching surface 628 that extends parallel to the interior surface 622 of the vent member 624. The right side 630 of the hook-shaped protrusion 620 is smooth.

Prior to actuation of the air bag module, the vent member 624 is in the closed position closing the vent opening 610. The second end 618 of the wire 616 is biased into a position in which the second end engages the right side 630 of the hook-shaped protrusion 620. The resiliency of the wire 616 acts to press the second end 618 against the right side 630 of the hook-shaped protrusion 620.

When the air bag module is actuated and the vent member 624 is moved from the closed position to the open position, the hook-shaped protrusion 620 moves out of engagement with the second end 618 of the wire 616. The solid lines of FIG. 18C illustrate the position of the hook-shaped protrusion 620 when the vent member 624 is in the open position. When the hook-shaped protrusion 620 moves out of engagement with the second end 618 of the wire 616, the resiliency of the wire 616 moves the second end 618 from the position illustrated in FIG. 18B to the position illustrated in FIG. 18C.

As the vent member 624 is moved from the open position, shown in FIG. 18B, back toward the closed position, the hook-shaped protrusion 620 engages the second end 618 of the wire 616, as shown by dashed lines in FIG. 18C, and presses the second end leftward, as viewed in FIG. 18C. Further movement of the vent member 624 toward the closed position causes the second end 618 of the wire 616 to snap over the latching surface 628 of the left side 626 of the hook-shaped protrusion 620 and into the position illustrated in FIG. 18D. When the second end 618 of the wire 616 is in the position illustrated in FIG. 18D, the vent member 624 is prevented from moving toward the open position.

Since the locking member 602 of FIGS. 18A-18D locks the vent member 624 in only one position relative to the support member 608, the locking member 602 is referred to as a single position locking member. FIG. 18E illustrates a hook-shaped protrusion 634 that may be used with the locking member 602 of FIGS. 18A-D for providing multiple position locking for the vent member 624.

The left side 636 of the hook-shaped protrusion 634 of FIG. 18E includes first, second, and third latching surfaces 638, 640, and 642, respectively. The hook-shaped protrusion 634 may include a number of latching surfaces other than three. The first latching surface 638 is located farthest from the vent member 624 and the third latching surface 642 is located nearest the vent member.

The hook-shaped protrusion 634 of FIG. 18E is designed so that the second end 618 of the wire 616 of FIG. 18A engages the first latching surface 638 when the vent member 624 is at a first position between the open and closed positions of the vent member. The second end 618 of the wire 616 engages the second latching surface 640 when the vent member 624 at a second position between the open and closed positions of the vent member. The vent member 624 is closer to the closed position at the second position than at the first position. The second end 618 of the wire 616 engages the third latching surface 642 when the vent member 624 reaches the closed position.

FIGS. 19A and 19B illustrate a twelfth alternative locking member 652. The locking member 652 of FIGS. 19A and 19B may be used with either the air bag module 10 of FIGS. 1-3 or the air bag module 130 of FIGS. 6-8. Like the locking member 602 of FIGS. 18A-18E, the locking member 652 of FIGS. 19A and 19B acts directly on the vent member 654 to prevent the closing portion 656 of the vent member from moving toward the open position after the closing portion of the vent member has been moved from the open position toward the closed position.

When the locking member 652 of FIGS. 19A and 19B is used with the air bag module 10 of FIGS. 1-3 or the air bag module 130 of FIGS. 6-8, the vent member 654 must be in the open position prior to actuation of the air bag module.

The locking member 652 of FIGS. 19A and 19B include a ratchet member 658 that extends outwardly from an exterior surface 660 of the support member 662. The ratchet member 658 is arced and includes a toothed inner surface 664. The toothed inner surface 664 illustrated in FIGS. 19A and 19B includes first, second, and third teeth 668, 670, and 672, respectively. Each of the first, second, and third teeth 668, 670, and 672 includes a tapered upper surface 674 and a flat lower surface 676, as viewed in FIGS. 19A and 19B.

The ratchet member 658 is located immediately adjacent the vent opening 678. An upper end 680 of the ratchet member 658 extends over the vent opening 678. The arc of the ratchet member 658 is designed to follow the movement of the closing portion 656 of the vent member 654. As shown in FIGS. 19A and 19B, the arc of the ratchet member 658 parallels a path traveled by the closing portion 656 of the vent member 654 during movement from the open position toward the closed position.

Prior to actuation of the air bag module, the vent member 654 is in the open position, as shown by FIG. 19A. When in the open position, a lower surface 682 of the vent member 654 rests upon the tapered upper surface 674 of the first tooth 668 of the ratchet member 658.

After actuation of the air bag module and inflation of the air bag beyond the predetermined distance, the vent member 654 moves from the open position toward the closed position. As the vent member 654 moves toward the closed position, the vent member 654 moves over the tapered upper surface 674 of the first tooth 668. At a first position between the open position and the closed position, the vent member 658 snaps under the first tooth 668. At the first position, the flat lower surface 676 of the first tooth 668 prevents movement of the vent member 654 back toward the open position.

When inflation of the air bag causes the vent member 654 to continue moving beyond the first position and toward the closed position, the vent member 654 moves over the tapered upper surface 674 of the second tooth 670. At a second position between the open position and the closed position, the vent member 654 snaps under the second tooth 670. At the second position, the flat lower surface 676 of the second tooth 670 prevents movement of the vent member 654 back toward the open position.

When inflation of the air bag causes the vent member 654 to move back closed position, the vent member 654 snaps under the third tooth 672. At the closed position, the flat lower surface 676 of the third tooth 672 prevents movement of the vent member 654 back toward the open position. The locking member 652 of FIGS. 19A and 19B provides multiple position locking for the vent member 654.

FIGS. 20A and 20B illustrate a thirteenth alternative locking member 702. The locking member 702 of FIGS. 20A and 20B may be used with either the air bag module 10 of FIGS. 1-3 or the air bag module 130 of FIGS. 6-8. The locking member 702 of FIGS. 20A and 20B acts directly on the vent member 704 to prevent the closing portion 706 of the vent member from moving toward the open position after the closing portion of the vent member has been moved from the open position toward the closed position.

When the locking member 702 of FIGS. 20A and 20B is used with the air bag module 10 of FIGS. 1-3 or the air bag module 130 of FIGS. 6-8, the vent member 704 must be in the open position prior to actuation of the air bag module.

The locking member 702 of FIGS. 20A and 20B includes a base portion 708 and a hook portion 710 that extends upwardly from the base portion, as viewed in FIGS. 20A and 20B. The hook portion 710 of the locking member 702 includes a support arm 712 that extends perpendicularly from an end of the base portion nearest the vent opening 714. The hook portion 710 also includes a lock arm 716 that extends outwardly of the support arm 712 on a side opposite the base portion 708. The lock arm 716 is angled relative to the support arm 712 so that the lock arm extends downwardly, as viewed in FIGS. 20A and 20B, as the lock arm extends away from the support arm.

The locking member 702 is formed from a resilient material. The base portion 708 of the locking member 702 is fixed to an exterior surface 718 of the support member 720 at a location adjacent the vent opening 714. A portion of the lock arm 716 extends over the vent opening 714 and into a path traveled by the closing portion 706 of the vent member 704 during movement from the open position to the closed position.

During movement of the closing portion 706 of the vent member 704 from the open position to the closed position, an end 722 of the vent member 704 engages the lock arm 716 of the hook portion 710 of the locking member 702. The end 722 of the vent member 704 applies a force against the lock arm 716 of the hook portion 710 that tend to move the lock arm downwardly and to the right, as viewed in FIG. 20A. When subjected to the force from the vent member 704, the lock arm 716 bends downwardly and the support arm 712 of the hook portion 710 bends to the right relative to the base 708.

The bending of the hook portion 710 of the locking member 702 enables the end 722 of the vent member 704 to pass by the lock arm 716. After the end 722 of the vent member 704 passes by the lock arm 716, the resiliency of the locking member 702 causes the hook portion 710 to return to its original state. When the hook portion 710 returns to its original state, the lock arm 716 of the hook portion 710 extends over the end 722 of the vent member 704 and prevents movement of the vent member toward the open position. Since the locking member 702 of FIGS. 20A and 20B locks the vent member 704 in only one position relative to the support member 720, the locking member 702 is referred to as a single position locking member.

FIGS. 21A and 21B illustrate a fourteenth alternative locking member 702a. The locking member 702a of FIGS. 21A and 21B may be used with either the air bag module 10 of FIGS. 1-3 or the air bag module 130 of FIGS. 6-8. The locking member 702a of FIGS. 21A and 21B acts directly between the vent member 704a and the support member 720a to prevent the closing portion 706a of the vent member from moving toward the open position after the closing portion of the vent member has been moved from the open position toward the closed position.

When the locking member 702a of FIGS. 21A and 21B is used with the air bag module 10 of FIGS. 1-3 or the air bag module 130 of FIGS. 6-8, the vent member 704a must be in the open position prior to actuation of the air bag module.

The locking member 702a of FIGS. 21A and 21B is identical to the locking member 702 described above with reference to FIGS. 20A and 20B. Therefore, the locking member 702a of FIGS. 21A and 21B are labeled with the same reference numbers as used in FIGS. 20A and 20B with the addition of the suffix "a".

The base portion 708a of the locking member 702a is fixed to an end 722a of the closing portion 706a of the vent member 704a. A portion of the lock arm 716a extends outwardly from an edge 726 of the end 722a.

During movement of the closing portion 706a of the vent member 704a from the open position to the closed position, the lock arm 716a engages the exterior surface 718a of the support member 720a at a location adjacent the vent opening 714a. The engagement between the lock arm 716a and the exterior surface 718a bends the lock arm upwardly and bends the support arm 712a of the hook portion 710a to the left, as viewed in FIG. 21A.

The bending of the hook portion 710a of the locking member 702a enables the lock arm 716a to pass through the vent opening 714a. After the lock arm 716a passes through the vent opening 714a, the resiliency of the locking member 702a causes the hook portion 710a to return to its original state. When the hook portion 710a returns to its original state, the lock arm 716a of the hook portion 710a extends under an interior surface 728 of the support member 720a at a location adjacent the vent opening 714a and prevents movement of the vent member 704a toward the open position. Since the locking member 702a of FIGS. 21A and 21B locks the vent member 704a in only one position relative to the support member 720a, the locking member 702a is referred to as a single position locking member.

Figure 22A:
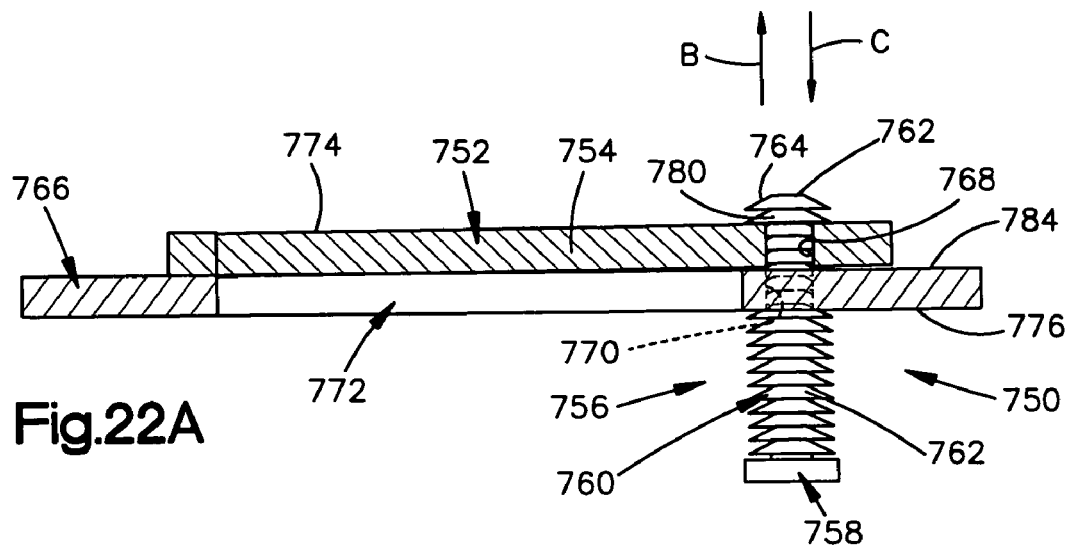
FIGS. 22A-C illustrate a fifteenth alternative locking member.
Figure 22B:
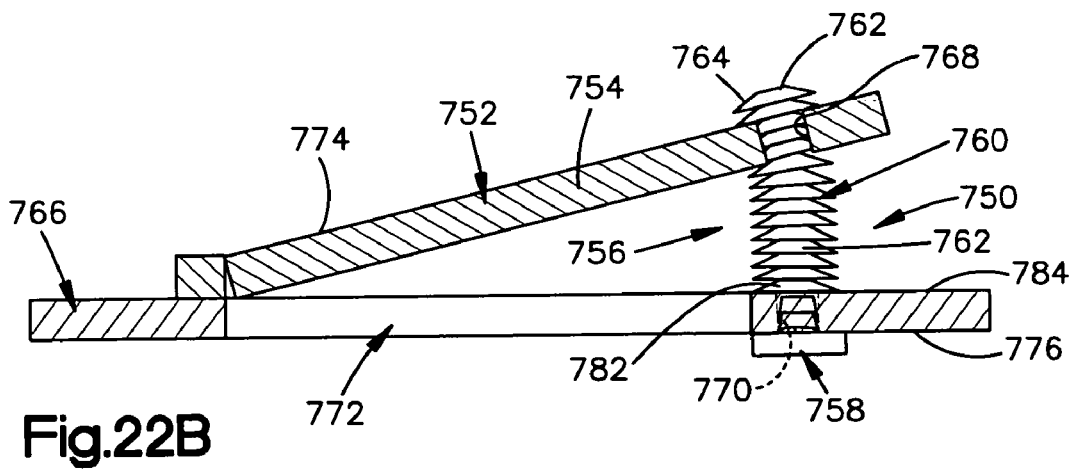
Figure 22C:
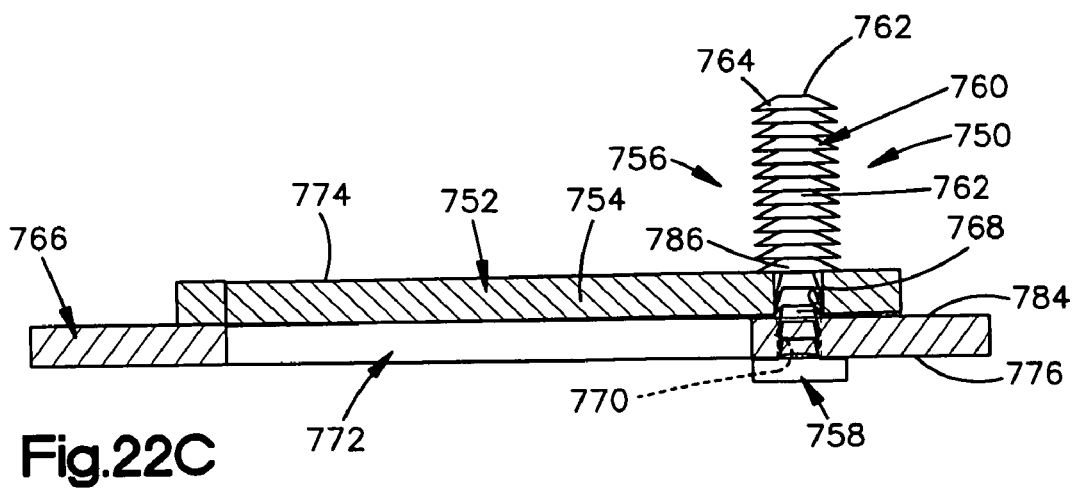

FIGS. 22A-22C illustrate a fifteenth alternative locking member 750. The locking member 750 of FIGS. 22A-22C may be used with either the air bag module 10 of FIGS. 1-3 or the air bag module 130 of FIGS. 6-8. The locking member 750 of FIGS. 22A-22C acts directly on the vent member 752 to prevent the closing portion 754 of the vent member from moving toward the open position after the closing portion of the vent member has been moved from the open position toward the closed position.

The locking member 750 of FIGS. 22A-22C includes a pin 756 of the type commonly referred to as a "Christmas tree pin." The pin 756 includes a head portion 758 and a shank portion 760. The head portion 758 of the pin 756 is circular and the shank portion 760 extends outwardly from a center of the head portion. The shank portion 760 includes an elongated main body portion (not shown) and a plurality of tabs 762. The tabs 762 extend along the shank portion 760 from an end of the main body portion opposite the head portion 758 to the head portion.

Each tab 762 extends circumferentially around the main body portion of the shank portion 760 of the pin 756. Each tab 762 is generally cone shaped and includes a tapered outer surface 764 that extends toward the head portion 758 of the pin 756 as the tapered outer surface extends radially outwardly of the main body portion of the shank portion 760.

The pin 756 is molded from a resilient plastic or rubber material. The tabs 762 are adapted to bend radially inwardly toward the main body portion of the shank portion 760 during movement over the tabs in a direction toward the head portion 758 of the pin. The tabs 762 are adapted to resist bending during movement over the tabs in a direction away from the head portion 758 of the pin 756.

Both the closing portion 754 of the vent member 752 and the support member 766 include through-holes 768 and 770, respectively. The through-holes 760 and 770 are coaxial with one another when the vent member 752 is in the closed position and are sized for receiving the shank portion 760 of the pin 756. The tabs 762 of the shank portion 760 of the pin 756 enable movement of the shank portion through the through-holes 768 and 770 in a first direction, illustrated by arrow B in FIG. 22A, and prevent movement of the shank portion through the through-holes in a second, opposite direction, illustrated by arrow C in FIG. 22A.

Prior to actuation of the air bag module, the vent member 752 is in the closed position closing the vent opening 772. The shank portion 760 of the pin 756 extends through the through-holes 668 and 670 so that the end of the shank portion opposite the head portion 758 is located slightly above, as viewed in FIG. 22A, the upper surface 774 of the vent member 752 and the head portion is spaced away from an interior surface 776 of the support member 766, as shown in FIG. 22A. In the position illustrated in FIG. 22A, a tab 780 located near the end of the shank portion 760 of the pin 758 engages an upper surface 774 of the vent member 752.

When the air bag module is actuated and the vent member 752 is moved from the closed position to the open position, the tab 780 that engages the upper surface 774 of the vent member 752 locks the shank portion 760 of the pin 756 for movement with the vent member. The shank portion 760 of the pin 756 is moved upwardly from the position illustrated in FIG. 22A to the position illustrated in FIG. 22B. During the upward movement of the pin 756, the tabs 762 on the shank portion 760 bend downwardly to enable the shank portion to pass through the through-hole 770 of the support member 766. When the vent member 752 is in the open position, the head portion 758 of the pin 756 engages the interior surface 776 of the support member 766. Thus, the pin 756 acts to control the open position of the vent member 752 by preventing movement of the vent member beyond a specified open position.

When the vent member 752 is in the open position, as shown in FIG. 22B, a second tab 782 engages the exterior surface 784 of the support member 766 and prevents movement of the pin 756 downwardly, as viewed in FIG. 22B, relative to the support member. As the vent member 752 is moved from the open position back toward the closed position, the shank portion 760 of the pin 756 passes through the through-hole 768 of the vent member. As the vent member 752 passes over each tab 762 of the shank portion 760 that tab acts to prevent movement of the vent member back toward the open position.

FIG. 22C illustrates the vent member 752 back in the closed position. When in the closed position, a third tab 786 engages the exterior surface 774 of the vent member 752 to prevent movement of the vent member back toward the open position. Since each tab 762 of the locking member 750 of FIGS. 22A-22B prevents movement of the vent member 752 back toward the open position, the locking member 750 of FIGS. 22A-22C provides multiple position locking for the vent member 752.

As set forth briefly above, the locking member 750 of FIGS. 22A-22C may also be used to control the open position of the vent member 752. Since the head portion 758 of the pin 756 moves upwardly, as viewed in FIGS. 22A-22C into engagement with the interior surface 776 of the support member 766, the initial distance of the head portion 758 from the interior surface 776 may be used for controlling the open position of the vent member 752 and for preventing opening of the vent member beyond the specified open position. For example, if it is desired for the open position of the vent member 752 to an angle of twenty degrees relative to the support member 766, the initial distance between the head portion 758 of the pin 756 and the interior surface 776 may be chosen so that the head portion engages the interior surface when the vent member reaches the twenty degree angle, as is illustrated in FIG. 22B. Thus, the locking member 750 of FIGS. 22A-22C may also be used to prevent the vent member 752 from opening beyond the specified open position, e.g., twenty degrees.

Figure 23:
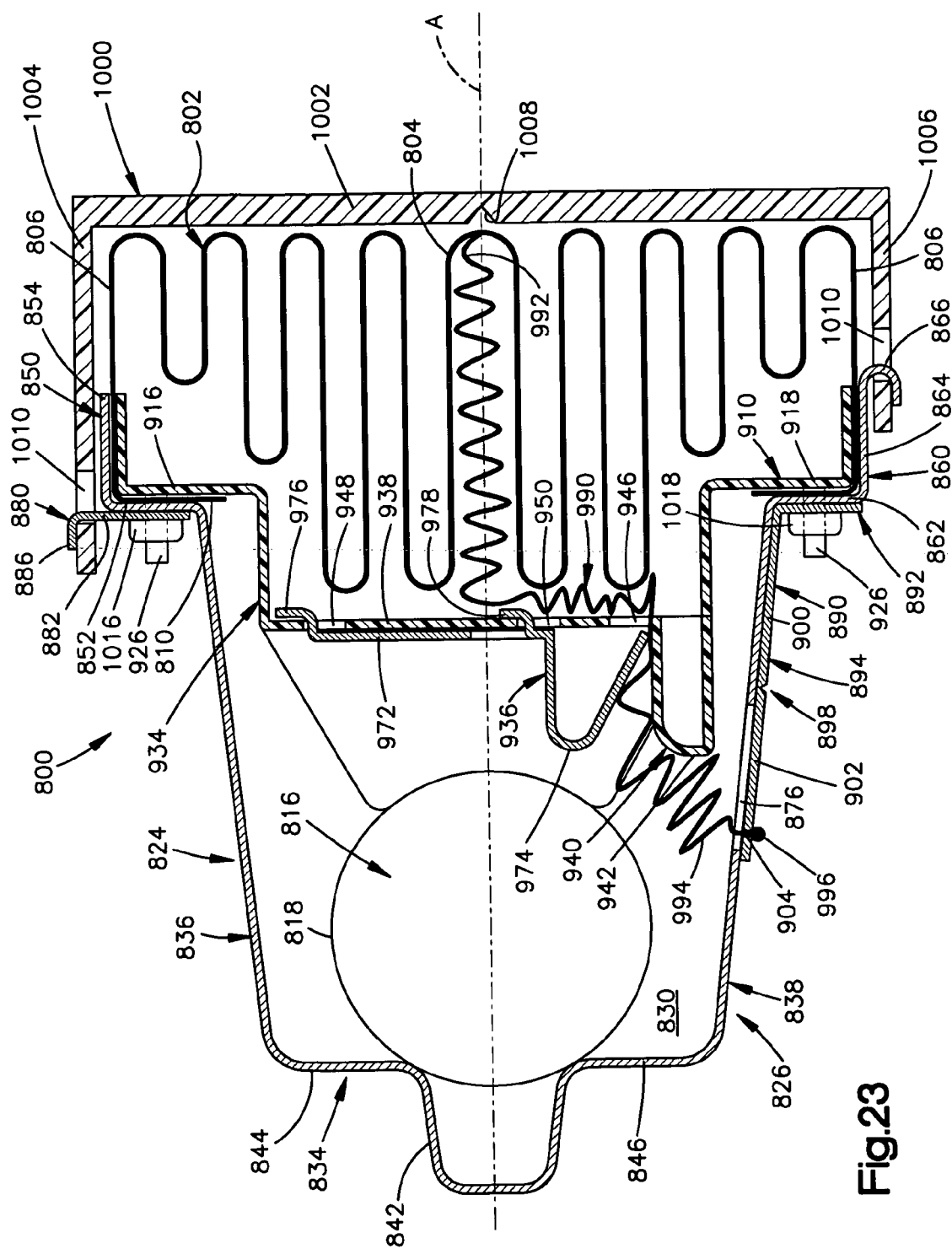
FIG. 23 is a sectional view of a vehicle occupant protection apparatus constructed in accordance with a third embodiment of the present invention and with a vent member in a closed position prior to actuation of an inflator.

FIG. 23 is a sectional view of a vehicle occupant protection apparatus 800 constructed in accordance with a third embodiment of the present invention. The vehicle occupant protection apparatus 800 of FIG. 23 is also a passenger side air bag module.

The air bag module 800 includes an inflatable occupant protection device in the form of an air bag 802. The air bag 802 is preferably made from a flexible fabric material, such as woven nylon. The air bag 802 has a deflated and stored condition in which the air bag is packed within the air bag module 800. In response to receiving inflation fluid, the air bag 802 inflates from the deflated and stored condition, shown in FIG. 23, to an inflated condition (not shown).

The air bag 802 includes an outer panel 804 and side panels 806 that collectively define an inflatable volume of the air bag. Ends of the side panels 806 opposite the outer panel 804 define a mouth portion 810 of the air bag 802. Inflation fluid flows through the mouth portion 810 of the air bag 802 and into the inflatable volume for inflating the air bag from the deflated and stored condition to the inflated condition.

The air bag module 800 includes an inflator 816 that is actuatable for providing inflation fluid for inflating the air bag 802. The inflator 816 may be any known inflator and may comprise, for example, a quantity of ignitable gas-generating material, a quantity of stored gas under pressure, a combustible mixture of gases, or a quantity of stored gas together with pyrotechnic material for heating the stored gas. The inflator 816 illustrated in FIG. 23 has a generally cylindrical outer surface 818.

The air bag module 800 also includes a reaction can 824. When the air bag module 800 is installed in a vehicle, the reaction can 824 is fixed relative to the vehicle. The reaction can 824 receives the reaction forces associated with actuation of the inflator 816 and inflation of the air bag 802.

The reaction can 824 may be formed from metal, high strength plastic, or some other suitable high strength material. The reaction can 824 illustrated in FIG. 23 includes a C-shaped main body portion 826 and opposite side wall portions (not shown). The side wall portions attach to and close laterally opposite sides of the main body portion 826. When the side wall portions are attached to the main body portion 826, a chamber 830 is defined within the reaction can 824.

The main body portion 826 of the reaction can 824 includes an end wall 834 and opposite upper and lower walls 836 and 838, respectively. As shown in FIG. 23, the end wall 834 includes a central portion 842 that separates upper and lower portions 844 and 846, respectively. The central portion 842 of the end wall 834 extends away from the upper and lower walls 836 and 838 of the main body portion 826 of the reaction can 824 along a central axis A of the reaction can. The upper and lower portions 844 and 846 of the end wall 834 are oriented generally perpendicular to axis A.

As shown in FIG. 23, the upper wall 836 of the main body portion 826 of the reaction can 824 extends away from the upper portion 844 of the end wall 834. While extending away from the upper portion 844 of the end wall 834, the upper wall 836 extends away from axis A. Thus, the greater the distance from the upper portion 844 of the end wall 834, the greater the distance between the upper wall 836 and axis A. The upper wall 836 terminates opposite the end wall 834 with an end portion 850. The end portion 850 of the upper wall 836 includes a radial portion 852 and an axial portion 854. The radial portion 852 extends away from axis A and is oriented generally perpendicular to axis A. Multiple through-holes (not shown) extend through the radial portion 852 of the end portion 850 of the upper wall 836. The axial portion 854 of the end portion 850 extends away from the radial portion 852 and is oriented in a direction generally parallel to axis A, as shown in FIG. 23.

Also, as shown in FIG. 23, the lower wall 838 of the main body portion 826 of the reaction can 824 extends away from the lower portion 846 of the end wall 834. While extending away from the lower portion 846 of the end wall 834, the lower wall 838 extends away from axis A. Thus, the greater the distance from the lower portion 846 of the end wall 834, the greater the distance between the lower wall 838 and axis A.

The lower wall 838 terminates opposite the end wall 834 with an end portion 860. The end portion 860 of the lower wall 838 includes a radial portion 862, an axial portion 864, and a hooked portion 866. The radial portion 862 extends away from axis A and is oriented generally perpendicular to axis A. Multiple through-holes (not shown) extend through the radial portion 862 of the end portion 860 of the lower wall 838. The axial portion 864 of the end portion 860 extends away from the radial portion 862 and is oriented in a direction generally parallel to axis A, as shown in FIG. 23. The hooked portion 866 extends away from axis A from an end of the axial portion 864 opposite the radial portion 862. The hooked portion 866 is formed from multiple hooks, one of which is shown in FIG. 23. The hooks of the hooked portion 866 are curved so that a terminal end of each hook extends toward the radial portion 862 of the end portion 860 and is oriented in a direction generally parallel to axis A.

The air bag module 800 also includes a cover attaching member 880. The cover attaching member 880 is L-shaped and includes a base portion 882 and a hooked portion 886 that extends generally perpendicular to the base portion. Multiple spaced apart through-holes (not shown) extend through the base portion 882 of the cover attaching member 880 at a location adjacent a lower end, as viewed in FIG. 23. The hooked portion 886 of the cover attaching member 880 extends rearward, as viewed in FIG. 23, from an upper end of the base portion 882. The hooked portion 886 is formed from multiple hooks, one of which is shown in FIG. 23.

A generally rectangular vent opening 876 extends through the lower wall 838 of the reaction can 824. Inflation fluid may exit the chamber 830 of the reaction can 824 through the vent opening 876. The vent opening 876 illustrated in FIG. 23 is located on the lower wall 838 of the reaction can 824 approximately equidistant between the end wall 834 and the end portion 860 of the lower wall.

The air bag module 800 also includes a vent member 890. The vent member 890 is associated with the vent opening 876. The vent member 890 has a generally L-shaped configuration. The vent member 890 includes a first portion 892 that is angled relative to a longer second portion 894. The angle separating the first and second portions 892 and 894 of the vent member 890 is approximately equal to the angle between the lower wall 838 of the reaction can 824 and the radial portion 862 of the end portion 860 of the lower wall. Multiple through-holes (not shown) extend through the first portion 892 of the vent member 890. The second portion 894 of the vent member 890 includes a living hinge 898. The living hinge 898 divides the second portion 894 of the vent member 890 into a substantially stationary part 900 and a movable part 902. A through-hole 904 extends through the movable part 902 of the second portion 894 at a location near a terminal end of the second portion. The movable part 902 of the second portion 894 of the vent member 890 is sized to close the vent opening 876 completely.

Figure 26:
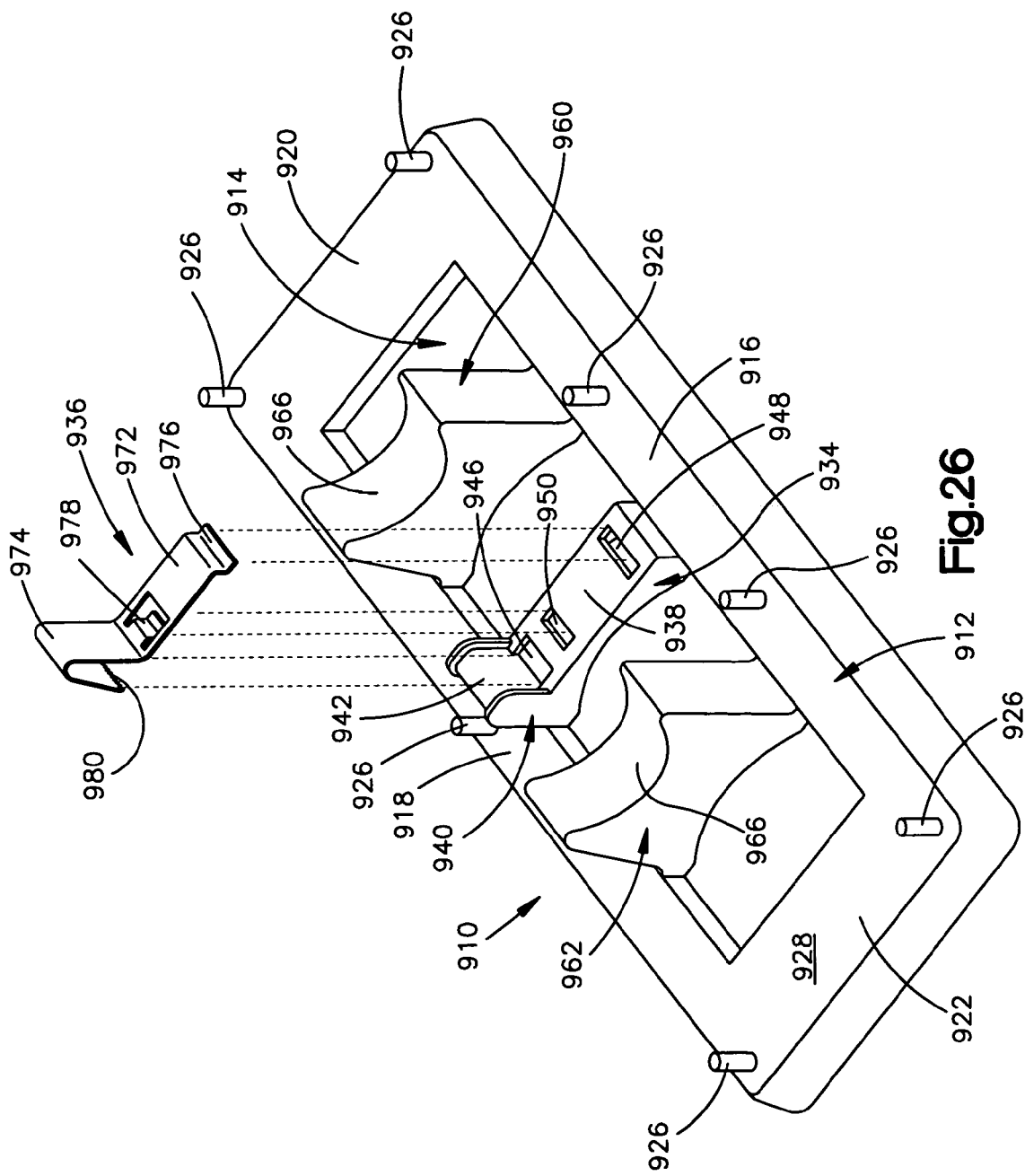
FIG. 26 is an exploded perspective view of a bag retainer and a tether locking member of the vehicle occupant protection apparatus of FIG. 23.

The air bag module also includes a bag retainer 910. Preferably, the bag retainer 910 is injection molded from a glass-filled nylon. The bag retainer 910 secures the mouth portion 810 of the air bag 802 to the reaction can 824. As shown in FIG. 26, the bag retainer 910 includes a generally rectangular outer frame 912 that defines a central opening 914. The outer frame 912 of the bag retainer 910 includes opposite long side portions 916 and 918, respectively, and opposite short side portions 920 and 922, respectively. The outer frame 912 of the bag retainer 910 is sized to fit in the reaction can 824 so that the long side portion 916 is received in the end portion 850 of the upper wall 836 and the long side portion 918 is received in the end portion 860 of the lower wall 838, as shown in FIG. 23. Multiple studs 926 extend away from a rear side surface 928 (FIG. 26) of the outer frame 912 of the bag retainer 910. FIG. 26 illustrates seven studs 926 extending outward of the rear side surface 928. Four studs 926 extend from long side portion 916 and three studs 926 extend from long side portion 918.

The bag retainer 910 also includes a support portion 934 for supporting a tether locking member 936. The support portion 934 is formed integrally with the bag retainer 910 as one piece and not from separate parts or structures secured together. The support portion 934 extends across the central opening 914 between the long side portions 916 and 918 of the outer frame 912 at a location approximately equidistant between the short side portions 920 and 922. The support portion 934 of the bag retainer 910 includes a generally planar upper wall 938 and a tether guide member 940 that extends upward, as viewed in FIG. 26, beyond the upper wall at a location adjacent the long side portion 918 of the outer frame 912. The tether guide member 940 includes a curved tether guide surface 942.

Three through-holes extend through the support portion 934. The first through-hole 946 intersects the upper wall 938 of the support portion 934 at a location adjacent the tether guide surface 942. The second through-hole 948 intersects the upper wall 938 of the support member 934 at a location adjacent the long side portion 916. The third through-hole 950 intersects the upper wall 938 at a location between the first and second through-holes 946 and 948 and nearer the first through-hole.

The bag retainer 910 also includes first and second inflator support towers 960 and 962. The first inflator support tower 960 extends across the central opening 914 between the long side portions 916 and 918 of the outer frame 912 at a location approximately equidistant between the support portion 934 and the short side portion 920. The second inflator support tower 962 extends across the central opening 914 between the long side portions 916 and 918 of the outer frame 912 at a location approximately equidistant between the support portion 934 and the short side portion 922. The first and second inflator support towers 960 and 962 are identical in shape and size. The first and second inflator support towers 960 and 962 extend away from the rear side surface 928 of the outer frame 912 a distance greater than the distance that the tether guide member 940 of the support member 934 extends away from the rear side surface. The first and second inflator support towers 960 and 962 include concave inflator support surfaces 966, as shown in FIG. 26.

FIG. 26 includes a perspective view of the tether locking member 936 of the air bag module 800. The tether locking member 936 is a resilient, one-piece structure that includes a base portion 972 and a lock portion 974. The base portion 972 of the tether locking member 936 is generally planar. The base portion 972 includes first and second legs 976 and 978, respectively. The first leg 976 is formed at a terminal end of the base portion 972 opposite the lock portion 974. The first leg 976 extends downward, in a generally perpendicular direction, from the base portion 972 and then turns to extend in a direction parallel to and away from the base portion. The first leg 976 is sized to fit through the second through-hole 948 of the support portion 934 of the bag retainer 910 and to lock under the upper wall 938, as shown in FIG. 23. The second leg 978 is formed near the lock portion 974 of the tether locking member 936. The second leg 978 also extends downward, in a generally perpendicular direction, from the base portion 972 and then turns to extend in a direction parallel to the base portion and toward the first leg 976. The second leg 978 is sized to fit through the third through-hole 950 of the support portion 934 of the bag retainer 910 and to lock under the upper wall 938, as shown in FIG. 23.

The lock portion 974 of the tether locking member 936 extends upwardly, as viewed in FIG. 26, from an end of the base portion 972 opposite the first leg 976. The lock portion 974 has an inverted U-shape that terminates with retention teeth 980 (FIG. 26). When the first and second legs 976 and 978 of the tether locking member 936 are received in the second and third through-holes 948 and 950, respectively, of the support portion 934 of the bag retainer 910 and are locked under the upper wall 938 of the support portion, the retention teeth 980 of the lock portion 974 of the tether locking member 936 are biased into engagement with the tether guide surface 942 of the tether guide member 940.

The air bag module 800 of FIG. 23 also includes a tether 990. The tether 990 has a first end portion 992 that is fixed to the outer panel 804 of the air bag 802, such as by sewing. The first end portion 992 of the tether 990 thus is connected for movement with the outer panel 804 of the air bag 802. An opposite second end portion 994 of the tether 990 extends through the through-hole 904 in the vent member 890. The second end portion 994 of the tether 990 is connected below the vent member 890, as viewed in FIG. 23, to a spherical member 996 that is too large to pass through the through-hole 904. When the tether 990 is tensioned, the spherical member 996 transfers forces from the tether 990 to the movable part 902 of the vent member 890.

The air bag module 800 also includes a cover 1000 (FIG. 23). The cover 1000 includes an outer panel 1002 and side panels 1004 and 1006. The outer panel 1002 of the cover 1000 includes a tear seam 1008 that ruptures to enable deployment of the air bag 802 from the air bag module 800. Portions of the side panels 1004 and 1006 of the cover 1000 extend over the axial portions 854 and 864 of the end portions 850 and 860 of the upper and lower walls 836 and 838, respectively, of the reaction can 824. In the air bag module 800 illustrated in FIG. 23, the side panels 1004 and 1006 of the cover 1000 include through-holes 1010 for enabling the cover to be attached to the reaction can 824.

According to one method of assembling the air bag module 800 of FIG. 23, the first end portion 992 of the tether 990 is secured to the outer panel 804 of the air bag 802. The tether 990 is pulled through the first through-hole 946 of the bag retainer 910. The tether locking member 936 is secured to the support portion 934 of the bag retainer 910. When the tether locking member 936 is secured to the support portion 934 of the bag retainer 910, the tether 990 is secured between the lock portion 974 of the tether locking member 936 and the tether guide surface 942.

Next, the air bag 802 is folded into its stored condition. The inflator 816 is inserted into the reaction can 824 so that the cylindrical outer surface 818 of the inflator abuts against the end wall 834 of the reaction can at the transition between the central portion 842 and the upper portion 844 of the end wall and at the transition between the central portion 842 and the lower portion 846 of the end wall. The bag retainer 910, with the folded air bag 802, is then inserted into the reaction can 824. When the bag retainer 910 is inserted into the reaction can 824, the concave inflator support surfaces 966 of the inflator support towers 960 and 962 of the bag retainer 910 abut against the cylindrical outer surface 818 of the inflator 816 to retain the inflator in the position illustrated in FIG. 23. Also, the studs 926 that extend away from the rear side surface 928 of the outer frame 912 of the bag retainer 910 extend through the through-holes in the radial portions 852 and 862 of the end portions 850 and 860 of the upper and lower walls 836 and 838, respectively, of the reaction can 824.

The second end portion 994 of the tether 990 is then pulled out of the chamber 830 of the reaction can 824 through the vent opening 876 and is secured to the vent member 890. The vent member 890 is then secured to the reaction can 824 so that the movable part 902 of the vent member closes the vent opening 876 in the lower wall 838 of the reaction can 824. To secure the vent member 890 to the reaction can 824, the through-holes in the first portion 892 of the vent member 890 receive the studs 926 of the bag retainer 910 that extend through the radial portion 862 of the end portion 860 of the lower wall 838. Nuts, one of which is shown in FIG. 23 at 1018, are placed on the studs 926 to secure the vent member 890 relative to the reaction can 824.

The cover attaching member 880 is then secured to the end portion 850 of the upper wall 836 of the reaction can 824. To secure the cover attaching member 880 to the end portion 850 of the upper wall 836, the through-holes in the base portion 882 of the cover attaching member 880 receive the studs 926 of the bag retainer 910 that extend through the radial portion 852 of the end portion 850 of the upper wall 836. Nuts, one of which is shown in FIG. 23 at 1016, are placed on the studs 926 to secure the cover attaching member 880 relative to the reaction can 824.

Lastly, the cover 1000 is secured to the reaction can 824. To secure the cover 1000 to the reaction can 824, each through-hole 1010 of the side panel 1004 of the cover 1000 receives one of the hooks of the hooked portion 886 of the cover attaching member 880. Similarly, each through-hole 1010 of the side panel 1006 of the cover 1000 receives one of the hooks of the hooked portion 866 of the lower wall 838 of the reaction can 824.

When the air bag module 800 is in the non-actuated condition, as is shown in FIG. 23, the vent member 890 is in a closed position closing the vent opening 876. When the vent member 890 is in the closed position, debris and other foreign matter are prevented from entering the chamber 830 of the air bag module 800 through the vent opening 876.

When the inflator 816 of the air bag module 800 is actuated, inflation fluid exits the inflator 816 and begins to fill the air bag 802. In response to receiving inflation fluid from the inflator 816, the air bag 802 expands and begins to press against the front panel 1002 of the cover 1000. As additional inflation fluid enters the air bag 802, the pressure within the air bag 802 and the chamber 830 increases. The pressure within the chamber 830 acts on the movable part 902 of the vent member 890 through the vent opening 876 in the lower wall 838 of the reaction can 824. Since an exterior surface of the vent member 890 is subject to atmospheric pressure, a pressure differential arises across the movable part 902 of the vent member 890. When the pressure differential reaches a predetermined level, the vent member 890 bends at its hinge 898 and the movable part 902 of the vent member moves away from the vent opening 876. Thus, in response to the pressure differential, the vent member 890 moves from the closed position, shown in FIG. 23, to an open position, shown in FIG. 24. When the vent member 890 is in the open position, inflation fluid may flow out of the chamber 830 through the vent opening 876.

Since the output of inflation fluid from the inflator 816 is greater than the amount of inflation fluid that may exit the air bag 802 through the vent opening 876, the inflation fluid pressure within the air bag 802 continues to increase after the vent member 890 is moved to the open position. The increasing pressure in the air bag 802 results in an increasing pressure that is applied to the front panel 1002 of the cover 1000. The increasing pressure that is applied to the front panel 1002 of the cover 1000 eventually ruptures the tear seam 1008 of the front panel 1002 of the cover 1000 and enables the air bag 802 to expand outward of the chamber 830 of the air bag module 800.

As the air bag 802 inflates, the outer panel 804 of the air bag 802 moves away from the reaction can 824 and away from the vent member 890. If the outer panel 804 moves away from the reaction can 824 by less than a predetermined distance, slack remains in the tether 990. When slack remains in the tether 990 as a result of the outer panel 804 of the air bag 802 moving away from the reaction can 824 by less than the predetermined distance, the tether 990 does not pull on the vent member 890 and the vent member remains in the open position, spaced apart from the vent opening 876. This enables a flow of inflation fluid away from the air bag 802 through the vent opening 876. Such venting of the air bag 802 can reduce the force and pressure with which the air bag inflates.

When the outer panel 804 of the air bag 802 moves away from the reaction can 824 by more than the predetermined distance, the slack is completely removed from the tether 990 and the tether is tensioned. The tensioned tether 990 turns as it passes over the tether guide surface 942 and pulls the vent member 890 from the open position, shown in FIG. 24, back toward the closed position in which the vent member blocks the flow of inflation fluid through the vent opening 876. FIG. 25 illustrates the tether 990 moving the vent member 890 back toward the closed position. When the vent member 890 is moved back into the closed position during inflation of the air bag 802, the air bag 802 inflates with full force and pressure.

The tether locking member 936 prevents movement of the tether 990 between the tether guide surface 942 and the tether locking member in a direction toward the vent member 890. When a force acts to pull the tether 990 between the tether guide surface 942 and the tether locking member 936 in a direction toward the vent member 890, the retention teeth 980 of the lock portion 974 of the tether locking member 936 grip the tether 990 to block movement of the tether toward the vent member 890. When a force acts to pull the tether 990 between the tether guide surface 942 and the tether locking member 936 in a direction toward the outer panel 804 of the air bag 802, the force causes the lock portion 974 of the tether locking member 936 to bend away from the tether guide surface 942. As a result, the tether 990 may move between the tether guide surface 942 and the tether locking member 936 in a direction toward the outer panel 804 of the air bag 802. Thus, the tether locking member 936 prevents travel of the tether 990 in a first direction toward the vent member 890 and allows travel of the tether in a second direction toward the outer panel 804 of the air bag 802.

During assembly of the air bag module 800, a predetermined amount of the tether 990 may be located between the vent member 890 and the tether locking member 936. The remainder of the tether 990 is located between the tether locking member 936 and the outer panel 804 of the air bag 802. The predetermined amount of the tether 990 is chosen to control the location of the open position of the vent member 890. To aid in providing the predetermined amount of the tether 990 between the vent member 890 and the tether locking member 936 during assembly, the tether 990 may include a tether positioning aid (not shown). The tether positioning aid may be a knot that is formed in the tether 990. Alternatively, the tether positioning aid may be markings on the tether 990, or a member that is sewn or otherwise fixed to the tether.

Figure 24:
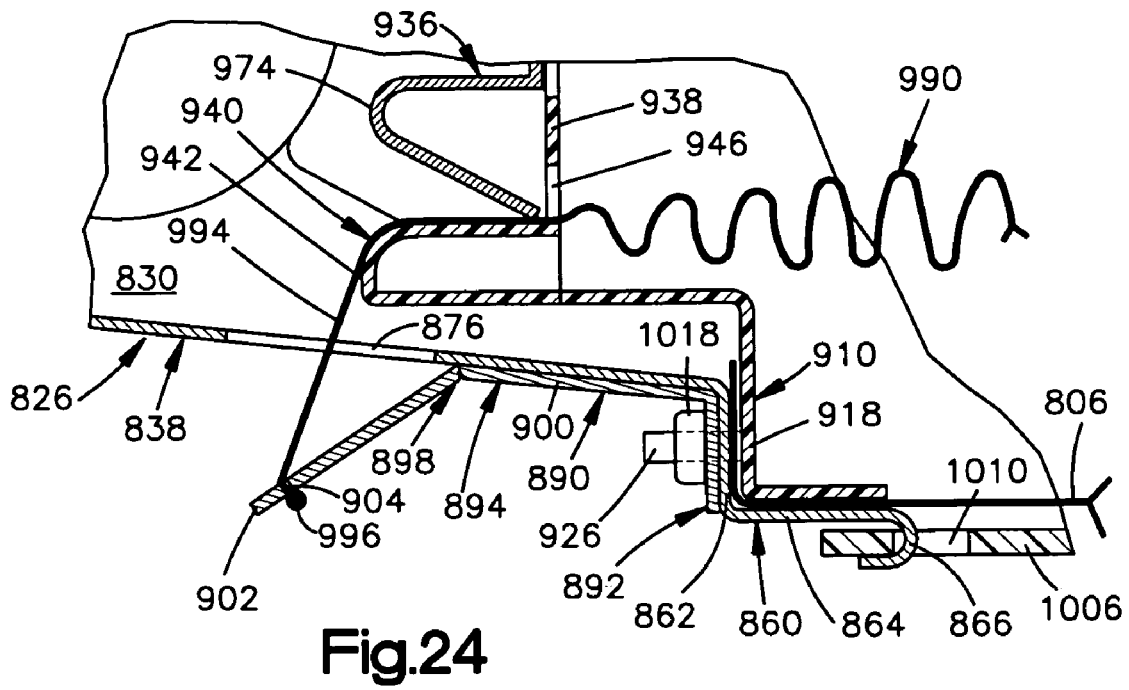
FIG. 24 is an enlarged view of a portion of the vehicle occupant protection apparatus of FIG. 23 after actuation of the inflator and with the vent member in an open position.
Figure 25:
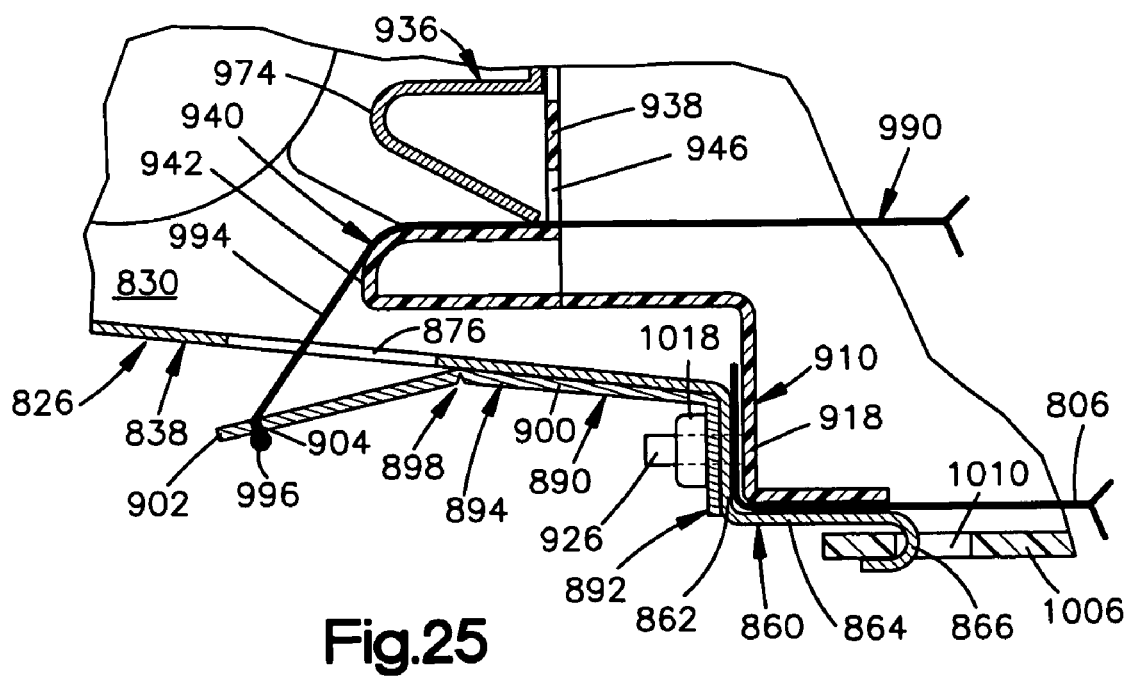
FIG. 25 is an enlarged view of a portion of the vehicle occupant protection apparatus of FIG. 23 after actuation of the inflator and with the vent member being moved back toward the closed position.

When the inflator 816 of the air bag module 800 is actuated, the pressure within the chamber 830 acts on the vent member 890 and moves the vent member from the closed position, shown in FIG. 23, to the open position, shown in FIG. 24. When the vent member 890 is in the open position, the predetermined amount of the tether 990 located between the vent member 890 and the tether locking member 936 is pulled taut, as shown in FIG. 24. Since the tether locking member 936 prevents movement of the tether 990 toward the vent member 890, the tautness of predetermined amount of the tether 990 prevents further movement of the vent member 890. Thus, the tether locking member 936 and the predetermined amount of the tether 990 control the open position of the vent member 890 and control the amount of fluid that may flow out of the chamber 830 through the vent opening 876 when the vent member is in the open position.

When the outer panel 804 of the air bag 802 moves away from the reaction can 824 by the predetermined distance, the slack is completely removed from the tether 990 and the tether is tensioned. Further movement of the outer panel 804 of the air bag 802 away from the reaction can 824 acts to pull the tether 990 past the tether locking member 936 in the direction of the outer panel, i.e., rightward, as viewed in FIGS. 23-25. The movement of the tether 990 pulls the vent member 890 from the open position, shown in FIG. 23, back toward the closed position in which the vent member blocks the flow of inflation fluid through the vent opening 876.

When the air bag module 800 is actuated for helping to protect an occupant of a vehicle, the vent member 890 may be at any position between the open position and the closed position when occupant interaction with the air bag 802 prevents further movement of the outer panel 804 of the air bag away from the reaction can 824. The interaction between the occupant and the air bag 802 may result in an increase in pressure within the air bag and the chamber 830 of the reaction can 824 that tends to force the vent member 890 away from the reaction can and back toward the open position. By preventing the tether 990 from moving toward the vent member 890, the tether locking member 936 prevents the movement of the vent member 890 back toward the open position. Thus, the tether locking member 936 blocks movement of the vent member 890 that would increase a flow of inflation fluid through the vent opening 876 to reduce pressure in the air bag 802. As a result, the tether locking member 936 helps to maintain pressure within the air bag 802.

The tether locking member 936 prevents the movement of the vent member 890 back toward the open position regardless of the position of the vent member along the path between the open and closed positions at the occurrence of the interaction between the occupant and the air bag 802. Thus, the tether locking member 936 may be referred to as being "infinitely adjustable" as the tether locking member prevents movement of the vent member 890 toward the open position at all positions of the vent member between the open and closed positions.

Each of the locking members of the present invention acts to block its associated vent member from being moved toward the open condition by increased pressure in the air bag resulting from occupant interaction with the air bag. By blocking movement of its associated vent member toward the open condition, the locking member helps to maintain pressure in the air bag and reduces a possibility of the inflation fluid pressure being uncontrollably reduced.

From the above description of the invention, those skilled in the art will perceive improvements, changes and modifications. For example, any of the locking members described may be used with the air bag module 10 of FIGS. 1-3, the air bag module 130 of FIGS. 6-8, or the air bag module 800 of FIGS. 23-25. Such improvements, changes and modifications within the skill of the art are intended to be covered by the appended claims.

Having described the invention, we claim the following:

1. A vehicle occupant protection apparatus comprising:
    an inflatable occupant protection device;
    a vent opening through which inflation fluid may flow;
    a retainer to which the inflatable occupant protection device is secured;
    a vent member that is movable relative to the vent opening for controlling a flow of inflation fluid through the vent opening;
    a tether movable in response to inflation of the inflatable occupant protection device beyond a predetermined distance for moving the vent member;
    a tether guide member located on the retainer for guiding the tether; and
    a locking member for acting on the tether to block movement of the vent member that would otherwise increase the flow of inflation fluid through the vent opening after the inflatable occupant protection device has inflated beyond the predetermined distance.

2. The vehicle occupant protection apparatus of claim 1 wherein the tether guide member is formed as one piece with retainer and not from separate structures secured together.

3. The vehicle occupant protection apparatus of claim 1 wherein the tether extends between the inflatable vehicle occupant protection device and the vent member, the tether guide member including a surface upon which the tether turns when the tether is tensioned between the inflatable vehicle occupant protection device and the vent member.

4. The vehicle occupant protection apparatus of claim 1 wherein slack is present in the tether prior to inflation of the inflatable occupant protection device beyond the predetermined distance, the retainer including a feature for maintaining the tether adjacent to the tether guide member when slack is present in the tether.

5. The vehicle occupant protection apparatus of claim 4 wherein the feature of the retainer includes at least one surface of the retainer that defines a through-hole through which the tether extends.

6. The vehicle occupant protection apparatus of claim 1 wherein said locking member attaches to the retainer and holds the tether in abutting engagement with the tether guide member.

7. A vehicle occupant protection apparatus comprising:
    an inflatable occupant protection device;
    a vent opening through which inflation fluid may flow;
    a retainer to which the inflatable occupant protection device is secured;
    a vent member that is movable relative to the vent opening for controlling a flow of inflation fluid through the vent opening;
    a tether movable in response to inflation of the inflatable occupant protection device beyond a predetermined distance for moving the vent member;
    a tether guide member located on the retainer for guiding the tether; and
    a member that attaches to the retainer and holds the tether in abutting engagement with the tether guide member, wherein the member is a locking member, the locking member acting on the tether to block movement of the vent member and thereby, preventing an increase in the flow of inflation fluid through the vent opening after the inflatable occupant protection device has inflated beyond the predetermined distance.

8. The vehicle occupant protection apparatus of claim 7 wherein the vent member initially closes the vent opening, inflation fluid moving the vent member to open the vent opening, slack being present in a portion of the tether between the locking member and the vent member when the vent member initially closes the vent opening, movement of the vent member for opening the vent opening ceasing when the portion of the tether between the locking member and the vent member is pulled taut.

9. The vehicle occupant protection apparatus of claim 7 wherein the locking member includes a resilient lock portion that presses the tether against the tether guide member, the lock portion bending to enable movement of the tether through the retainer in a direction toward the inflatable occupant protection device, the lock portion preventing movement of the tether through the retainer in a direction toward the vent member.

10. The vehicle occupant protection apparatus of claim 9 wherein the lock portion of the locking member includes retention teeth for gripping the tether to help prevent movement of the tether through the retainer in a direction toward the vent member.

11. The vehicle occupant protection apparatus of claim 7 wherein the locking member includes at least one feature for enabling the locking member to be secured to a portion of the retainer adjacent the tether guide member.

12. The vehicle occupant protection apparatus of claim 11 wherein the at least one feature of the locking member include first and second legs that extend through throughholes in a support wall of the retainer and lock under the support wall.

13. A vehicle occupant protection apparatus comprising:
an inflatable occupant protection device;
a support member having a vent opening through which inflation fluid may flow;
a bag retainer securing the inflatable occupant protection device relative to the support member;
a vent member that is movable relative to the support member for controlling a flow of inflation fluid through the vent opening;
a tether extending between the inflatable occupant protection device and the vent member, the tether being responsive to inflation of the inflatable occupant protection device beyond a predetermined distance for moving the vent member;
a tether guide member for guiding the tether between the inflatable vehicle occupant protection device and the vent member, the tether guide member being located on the bag retainer; and a locking member for acting on the tether to block movement of the vent member that would otherwise increase the flow of inflation fluid through the vent opening after the inflatable occupant protection device has inflated beyond the predetermined distance.

14. The vehicle occupant protection apparatus of claim 13 wherein the locking member attaches to the bag retainer and holds the tether in abutting engagement with the tether guide member.

15. The vehicle occupant protection apparatus of claim 14 wherein the tether guide member is formed as one piece with the bag retainer and not from separate structures secured together.

16. The vehicle occupant protection apparatus of claim 14 wherein the locking member includes a resilient lock portion that presses the tether against the tether guide member, the lock portion bending to enable movement of the tether through the bag retainer in a direction toward the inflatable occupant protection device, the lock portion preventing movement of the tether through the bag retainer in a direction toward the vent member.

17. The vehicle occupant protection apparatus of claim 16 wherein the lock portion of the locking member includes retention teeth for gripping the tether to help prevent movement of the tether through the bag retainer in a direction toward the vent member.

18. The vehicle occupant protection apparatus of claim 14 wherein the locking member includes at least one feature for enabling the locking member to be secured to a portion of the bag retainer adjacent the tether guide member.

19. The vehicle occupant protection apparatus of claim 18 wherein the at least one feature of the locking member includes first and second legs that extend through throughholes in a support wall of the bag retainer and lock under the support wall.

20. A vehicle occupant protection apparatus comprising:
an inflatable occupant protection device;
a vent opening through which inflation fluid may flow;
a retainer to which the inflatable occupant protection device is secured;
a vent member that is movable relative to the vent opening for controlling a flow of inflation fluid through the vent opening;
a tether movable in response to inflation of the inflatable occupant protection device beyond a predetermined distance for moving the vent member; and
a locking member for acting on the tether to block movement of the vent member that would otherwise increase the flow of inflation fluid through the vent opening after the inflatable occupant protection device has inflated beyond the predetermined distance, the locking member being located on the retainer.

* * * * *